US 8,346,495 B2

(12) United States Patent
Gering

(10) Patent No.: US 8,346,495 B2
(45) Date of Patent: Jan. 1, 2013

(54) SYSTEMS, METHODS AND COMPUTER-READABLE MEDIA TO MODEL KINETIC PERFORMANCE OF RECHARGEABLE ELECTROCHEMICAL DEVICES

(75) Inventor: Kevin L. Gering, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 395 days.

(21) Appl. No.: 12/765,384

(22) Filed: Apr. 22, 2010

(65) Prior Publication Data

US 2011/0264381 A1 Oct. 27, 2011

(51) Int. Cl.
*G01R 31/36* (2006.01)
(52) U.S. Cl. ......................................................... 702/63
(58) Field of Classification Search ..................... 702/32, 702/63
See application file for complete search history.

(56) References Cited

U.S. PATENT DOCUMENTS

| | | |
|---|---|---|
| 6,480,003 B1 | 11/2002 | Ugaji et al. |
| 7,147,071 B2 | 12/2006 | Gering et al. |
| 7,315,789 B2 | 1/2008 | Plett |
| 7,400,149 B2 | 7/2008 | Koster et al. |
| 7,582,387 B2 | 9/2009 | Howard et al. |
| 8,191,618 B2 | 6/2012 | Gering et al. |
| 2001/0009371 A1 | 7/2001 | Podrazhansky et al. |
| 2001/0022518 A1 | 9/2001 | Asakura et al. |
| 2003/0022032 A1 | 1/2003 | Miller et al. |
| 2004/0220758 A1 | 11/2004 | Barsoukov et al. |
| 2006/0181953 A1 | 8/2006 | Rotenberg et al. |
| 2006/0186890 A1 | 8/2006 | Iwane et al. |
| 2006/0284617 A1 | 12/2006 | Kozlowski et al. |
| 2007/0090844 A1 | 4/2007 | Klang |
| 2007/0112475 A1 | 5/2007 | Koebler et al. |
| 2007/0252601 A1 | 11/2007 | Satoh et al. |
| 2008/0154956 A1 | 6/2008 | DeBie |
| 2009/0106970 A1 | 4/2009 | Fan et al. |

(Continued)

FOREIGN PATENT DOCUMENTS

WO 2008/154956 A1 12/2008

(Continued)

OTHER PUBLICATIONS

Domenico et al. "Lithium-Ion battery state of charge estimation with a Kalman Filter based on a electrochemical model", 2008, IEEE, pp. 702-707.*

(Continued)

*Primary Examiner* — Cindy H Khuu
(74) *Attorney, Agent, or Firm* — TraskBritt

(57) ABSTRACT

A system includes an electrochemical cell, monitoring hardware, and a computing system. The monitoring hardware samples performance characteristics of the electrochemical cell. The computing system determines cell information from the performance characteristics. The computing system also analyzes the cell information of the electrochemical cell with a Butler-Volmer (BV) expression modified to determine exchange current density of the electrochemical cell by including kinetic performance information related to pulse-time dependence, electrode surface availability, or a combination thereof. A set of sigmoid-based expressions may be included with the modified-BV expression to determine kinetic performance as a function of pulse time. The determined exchange current density may be used with the modified-BV expression, with or without the sigmoid expressions, to analyze other characteristics of the electrochemical cell. Model parameters can be defined in terms of cell aging, making the overall kinetics model amenable to predictive estimates of cell kinetic performance along the aging timeline.

28 Claims, 12 Drawing Sheets

U.S. PATENT DOCUMENTS

| | | | |
|---|---|---|---|
| 2009/0157369 A1 | 6/2009 | Li et al. | |
| 2010/0021776 A1 | 1/2010 | Dougherty et al. | |
| 2011/0060565 A1* | 3/2011 | Sciarretta et al. | 703/2 |
| 2011/0077880 A1 | 3/2011 | Gering | |
| 2011/0288797 A1* | 11/2011 | Schmidt | 702/63 |
| 2011/0301931 A1 | 12/2011 | Gering | |

FOREIGN PATENT DOCUMENTS

WO      2009/091407 A2      7/2009

OTHER PUBLICATIONS

Gering et al. "Evaluation of Performance Change in Lithium-ion Cells Using a Multiple Sigmoid Model", 2003, The Electrochemical Society, Inc., 1 page.

PCT International Search Report and Written Opinion of the International Searching Authority for PCT/US2011/038078, dated Sep. 9, 2011, 9 pages.

Gering, Kevin L., "Kinetic Performance of Li-ion cells during Short Pulses, with Emphasis on Low Temperature Behavior," Idaho National Laboratory, 2008, Retrieved from the Internet: <URL: http://web.archive.org/web/20081207132503/http://www.electrochem.org/meetings/scheduler/abstracts/214/1288.pdf> p. 1.

Ratnakumar et al., "Lithium-Ion Rechargeable Batteries on Mars Rover," 2nd International Energy Conversion Engineering Conference, 2004, Retrieved from the Internet: <URL: http://trs-new.jpl.nasa.gov/dspace/handle/2014/38818> pp. 1-8.

PCT International Search Report and Written Opinion of the International Searching Authority for PCT/US2011/030862, dated Jun. 21, 2011, 12 pages.

Ding et al., "Diminution of Supercooling of Electrolytes by Carbon Particles," J. Electrochem. Soc., vol. 146 (11), pp. 3974-3980, (1999).

Santana et al., "Electrochemical characterization and oxygen evolution at a heavily boron doped diamond electrode," Electrochem. Acta, vol. 50, pp. 2017-2027 (2005).

Wang et al., "Feasibility study for reductive destruction of carbon tetrachloride using bare and polymer coated nickel electrodes," J. Appl. Electrochemistry, vol. 35, pp. 243-248 (2005).

Christophersen et al., "Advanced Technology Development Program for Lithium-Ion Batteries: Gen 2 Performance Evaluation Final Report," Idaho National Laboratory, Jul. 2006. [retrieved on 2010-20-21] Retrieved from the internet: <URL: http://www.inl.gov/technical/publications/Documents/3395031.pdf>.

PCT International Search Report and Written Opinion of the International Searching Authority for PCT/US2010/048708, dated Nov. 9, 2010, 9 pages.

\* cited by examiner

SYSTEMS, METHODS AND COMPUTER-READABLE MEDIA TO MODEL KINETIC PERFORMANCE OF RECHARGEABLE ELECTROCHEMICAL DEVICES

CONTRACTUAL ORIGIN OF THE INVENTION

This invention was made with government support under Contract Number DE-AC07-05ID14517 awarded by the United States Department of Energy. The government has certain rights in the invention.

RELATED APPLICATION

This application is related to U.S. patent application Ser. No. 12/571,253, titled "SYSTEMS, METHODS AND COMPUTER READABLE MEDIA FOR ESTIMATING CAPACITY LOSS IN RECHARGEABLE ELECTROCHEMICAL CELLS," filed on Sep. 30, 2009, the disclosure of which is hereby incorporated by reference in its entirety.

TECHNICAL FIELD

The present invention relates generally to the field of batteries. Specifically, embodiments of the present invention relate to analysis of rechargeable electrochemical cells.

BACKGROUND

A battery converts stored chemical energy to electrical energy, which may be conveyed as a voltage potential. As a battery ages its storage capacity and conductance will decrease (i.e., fade) between a Beginning Of Life (BOL) and an End Of Life (EOL). Therefore, observations of battery parameters such as cycle rate (magnitude of current), cumulative cycling time, and storage capacity may be helpful in determining an overall State Of Health (SOH) of a battery over its service life.

In many contemporary battery systems such as lithium-ion (Li-ion), performance limitations at the cell level often relate to the effective rate or kinetics of the charge transfer reaction that occurs at either electrode surface. In terms of general electrochemistry for reversible systems, the electron-accepting charge transfer reaction occurs at the cathode surface during cell discharge, and occurs at the anode surface during cell charge. This overall process becomes more problematic for Li-ion cells having porous heterogeneous electrode materials that are typically covered by passivation films collectively known as the solid electrolyte interphase (SEI). Performance limitations during a cell pulse are then due to sluggish kinetics and are generally manifest by large impedance-driven voltage shifts and reduced power capabilities.

Kinetic performance limitations are directly related to a particular cell chemistry (choice of cell materials, their dimensions, and configuration within a cell) and can be more severe under specific operational conditions (for example, low temperature and low state-of-charge) and at advanced aging of a cell, making it more difficult if not irrelevant to model kinetic performance using classical theories developed several decades ago.

There is a need for systems and methods that provide a modeling capability that more accurately determines, tracks, diagnoses, and predicts kinetic performance in electrochemical cells and batteries formed therefrom.

BRIEF SUMMARY OF THE INVENTION

Embodiments of the present invention provide a modeling capability that more accurately determines, tracks, diagnoses, and predicts kinetic performance in electrochemical cells and batteries formed therefrom, considering particular conditions under which a cell is operated in direct-current (DC) mode.

An embodiment of the present invention comprises a method wherein at least one act of the method is performed by a processor, the method includes analyzing an electrochemical cell with a modified Butler-Volmer (BV) expression to determine an exchange current density. The modified BV expression includes a BV expression modified to include kinetic performance information for at least one of a pulse-time dependence and an electrode surface availability. Kinetic performance of the electrochemical cell is estimated at a desired point in pulse-time using the modified BV expression.

Another embodiment of the present invention comprises a model development method wherein at least one act of the method is performed by a processor. The method includes periodically sampling cell characteristics of an electrochemical cell. The cell characteristics of the electrochemical cell are analyzed with a modified Butler-Volmer (BV) expression to determine exchange current density, wherein a BV expression is modified to include kinetic performance information for at least one of a pulse-time dependence and an electrode surface availability. Kinetic performance of the electrochemical cell is estimated at a desired point in pulse time using the cell characteristics in the modified BV expression.

Another embodiment of the present invention comprises a method that includes analyzing a kinetic performance characteristic of an electrochemical cell with a modified Butler-Volmer (BV) expression to determine an exchange current density. The modified BV expression includes a BV expression modified to include kinetic performance information for at least one of a pulse-time dependence and an electrode surface availability. Kinetic performance of the electrochemical cell is estimated at a desired point in pulse time using the modified BV expression. The method also includes at least one of a discharge process for, a charge process for, and composition of, the electrochemical cell responsive to the kinetic performance estimate.

Another embodiment of the present invention comprises a system including an electrochemical cell, monitoring hardware, and a computing system. The monitoring hardware is operably coupled to the at least one electrochemical cell and is configured for periodically sampling cell characteristics of the electrochemical cell. The computing system is operably coupled to the monitoring hardware and is configured for periodically determining electrochemical cell information from the cell characteristics of the electrochemical cell. The computing system is also configured for periodically analyzing a kinetic performance characteristic of the electrochemical cell with a modified Butler-Volmer (BV) expression incorporating the electrochemical cell information to determine an exchange current density. The modified BV expression includes a BV expression modified to include kinetic performance information for at least one of a pulse-time dependence and an electrode surface availability.

Another embodiment of the present invention comprises a computer-readable medium including computer-executable instructions, which when executed on one or more processors, cause the processors to analyze an electrochemical cell with a modified Butler-Volmer (BV) expression to determine an exchange current density. The modified BV expression includes a BV expression modified to include kinetic performance information for at least one of a pulse-time dependence and an electrode surface availability. A kinetic performance of the electrochemical cell is estimated at a desired point in pulse time using the modified BV expression.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings, in which:

DETAILED DESCRIPTION OF THE INVENTION

Figure 1:
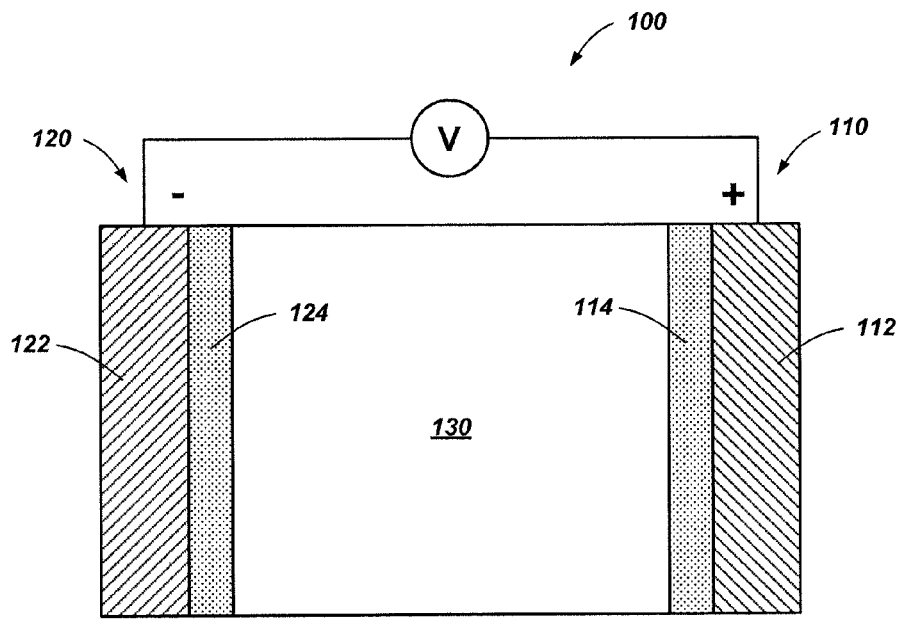
FIG. 1 is a simplified diagram of a rechargeable electrochemical cell.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Headings are included herein to aid in locating certain sections of detailed description. These headings should not be considered to limit the scope of the concepts described under any specific heading. Furthermore, concepts described in any specific heading are generally applicable in other sections throughout the entire specification.

Embodiments of the present invention provide a modeling capability that more accurately determines, tracks, diagnoses, and predicts kinetic performance in electrochemical cells and batteries formed therefrom, considering particular conditions under which a cell is operated in direct-current (DC) mode.

In embodiments discussed herein, the modified BV expression may be trained over the pulse-time domain by use of a sigmoid-based generalized electrochemical rate expression (GERE) that yields voltage drop information under unique conditions of temperature, state of charge, and extent of cell aging.

1. Hardware Environment

Much of the description herein concentrates on lithium-ion cells. However, embodiments of the present invention are not so limited and may be applicable to other types of electrochemical cells and other systems that degrade over time due to mechanisms that may be accurately modeled.

FIG. 1 is a simplified diagram of a rechargeable lithium-ion electrochemical cell 100. A typical lithium-ion cell 100 includes three primary functional components, an anode 120, a cathode 110, and electrolyte 130. The electrochemical cell 100 may also include a separator (e.g., a polymeric microporous material (not shown)) provided between the cathode 110 and the anode 120, also referred to herein as negative and positive electrodes 120, 110 respectively. A battery may include one or more electrochemical cells 100 to form a current and voltage capability based on the application for which it is used.

The cathode 110 includes a positive current collector 112 and a positive active material 114. The anode 120 includes a negative current collector 122 and a negative active material 124. In the context of Li-ion cells, both the positive active material 114 and the negative active material 124 are materials into which and from which lithium ions can migrate, that is, the cathode receives lithium from the anode during the discharge process, and stores such until the process is reversed under the charge process, wherein lithium is passed from cathode to anode. The movement of lithium ions into the active materials (114, 124) is often referred to as "intercalation" or "insertion" and the movement of lithium ions out of the active materials (114, 124) is referred to as "deintercalation" or "extraction."

The negative active material 124 may be a carbonaceous material such as graphite. The positive active material 114 may be a material, such as, for example, lithium cobalt oxide, lithium iron phosphate, or lithium manganese oxide. The positive current collector 112 and negative current collector 122 may be a material such as aluminum, copper, or other suitable electrically conductive material. The electrolyte 130 is typically an organic electrolyte that acts as an ionic path between electrodes 110 and 120.

The electrodes (110, 120) may be provided as relatively flat or planar plates or may be wrapped or wound in a spiral or other configuration (e.g., an oval configuration). The electrodes (110, 120) may also be provided in a folded configuration.

During charging and discharging of the electrochemical cell 100, lithium ions move through the electrolyte 130 between the positive electrode 110 and the negative electrode 120. For example, when the electrochemical cell 100 is discharging, lithium ions flow from the negative electrode 120 to the positive electrode 110. Conversely, when the electrochemical cell 100 is charging, lithium ions flow from the positive electrode 110 to the negative electrode 120.

A passivating layer, also referred to herein as solid electrolyte interphase (SEI), may develop between an electrode (110, 120) and the electrolyte 130 from the reductive or oxidative decompositions of a small amount of organic electrolytes mostly during the first several cycles of a working cell.

Figure 2:
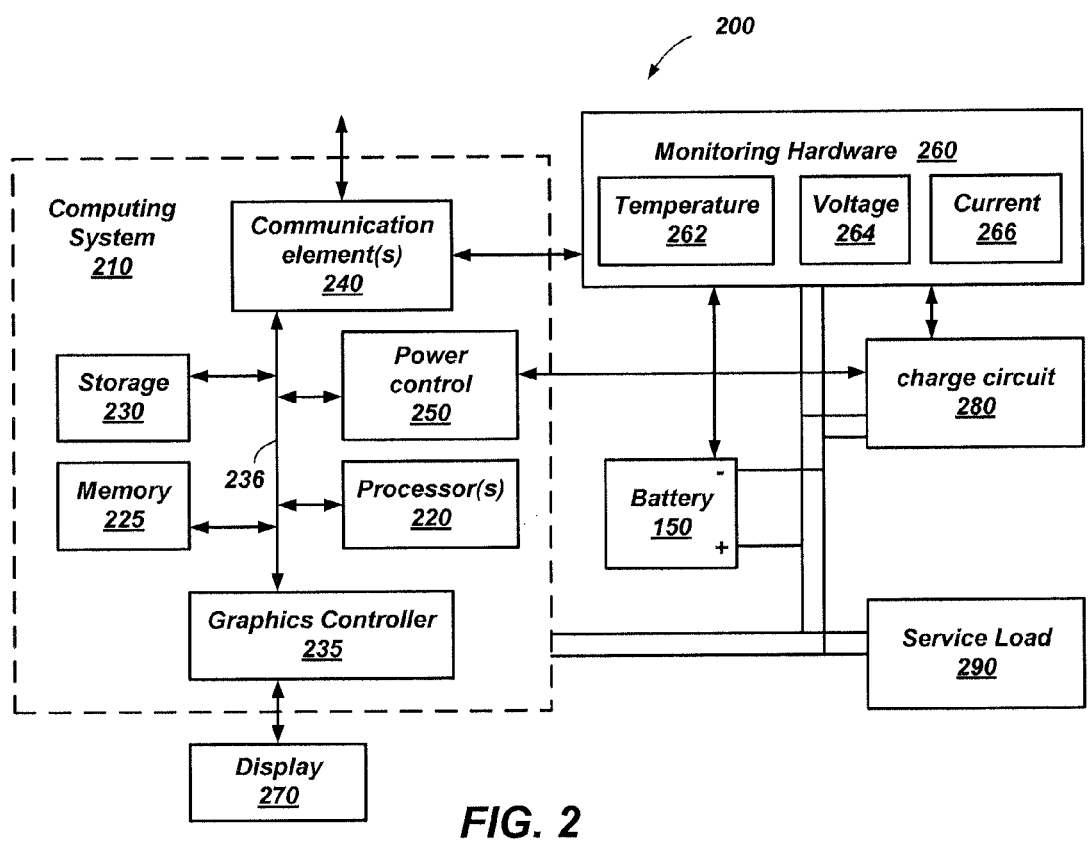
FIG. 2 is a simplified diagram of a system for analyzing, controlling, using, or a combination thereof, an electrochemical cell.

FIG. 2 is a simplified diagram of a system 200 for analyzing, monitoring, and controlling a battery 150. A computing system 210 is configured for executing software programs containing computing instructions and includes one or more processors 220, memory 225, one or more communication elements 240, and storage 230.

The one or more processors 220 may be configured for executing a wide variety of operating systems and applications including the computing instructions for carrying out embodiments of the present invention.

The memory 225 may be used to hold computing instructions, data, and other information for performing a wide variety of tasks including performing embodiments of the present invention. By way of example, and not limitation, the memory 225 may include Synchronous Random Access Memory (SRAM), Dynamic RAM (DRAM), Read-Only Memory (ROM), Flash memory, and the like.

The communication elements 240 may be configured for communicating with other devices or communication networks (not shown). As non-limiting examples, the communication elements 240 may interface with external hardware and software (e.g., for cell or battery charging through an external device or grid) or for downloading stored data to an external data logger, or computer. By way of example, and not limitation, the communication elements 240 may include elements for communicating on wired and wireless communication media, such as for example, serial ports, parallel ports, Ethernet connections, universal serial bus (USB) connections IEEE 1394 ("firewire") connections, BLUETOOTH® wireless connections, 802.1 a/b/g/n type wireless connections, and other suitable communication interfaces and protocols.

The storage 230 may be used for storing large amounts of non-volatile information for use in the computing system 210 and may be configured as one or more storage devices. By way of example, and not limitation, these storage devices may be, but are not limited to, magnetic and optical storage devices such as disk drives, magnetic tapes, CDs (compact disks), DVDs (digital versatile discs or digital video discs), and other equivalent storage devices.

When executed as firmware or software, the instructions for performing the processes described herein may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be held on the storage 230, transferred to the memory 225 for execution, and executed by the processor 220. The processor 220, when executing computing instructions configured for performing the processes, constitutes structure for performing the processes. In addition, some or all portions of the processes may be performed by hardware specifically configured for carrying out the processes.

The storage 230 and memory 225 are coupled to the processor 220 such that the processor 220 can read information from, and write information thereto. In the alternative, the storage medium may be integral to the processor. Furthermore, the processor 230, memory 225 and storage 230 may reside, in various combinations, in an ASIC or FPGA.

A graphics controller 235 is coupled to the processor 220 and to a display 270, which may present information about the battery 150 and the processes described herein in the form of pictures, text, tables, graphs, and the like.

The elements of the computing system 210 are illustrated, for simplicity, as communicating across a bus 236. However, those of ordinary skill in the art will recognize that the computing system may include many different busses for communication between the various elements.

Monitoring hardware 260 may be included in the system 200 for monitoring various cell characteristics, functions, and status of the battery 150. As is known in the art, a voltage monitor 264 and a current monitor 266 may be coupled to the battery 150 to monitor operational power characteristics of the battery 150. A temperature monitor 262 may be included to monitor overall temperature of the battery 150, temperature of individual cells in the battery 150, and combinations thereof. A timing monitor (not shown) may be included as monitoring hardware 260 or may be performed by the computing system 210. The timing monitor may track cycling of the battery 150 including times associated with charging and discharging the battery 150. The monitoring hardware 260 may be controlled and queried by the computing system 210 through general purpose or dedicated communication channels from the communication elements 240.

A charge circuit 280 may be included to control charging and possibly discharging of the battery 150. The charge circuit 280 may provide information related to timing and electrical power characteristics of the battery 150 to the monitoring hardware 260. The charge circuit 280 may be controlled by a dedicated power control module 250 on the computing system 210. Alternatively, the computing system 210 may control the charge circuit 280 through general purpose or dedicated communication channels from the communication elements 240.

A service load 290 generally represents other elements (not shown) within the system 200 that may draw power from the battery 150.

Functionally, the processes described herein may be considered to be controlled by a diagnostic center software process. The software process may include test protocols defined for cell interrogation using elements for data acquisition of cell characteristics such as current, voltage, and temperature over time and charge cycling. Diagnostic analysis algorithms may be defined as discussed below. Data regression algorithms may be implemented to define and refine various models and model parameters. Software modules may be included to store data in various raw and processed forms as may be needed by other processes and a data logger may be included to collect and store a performance history of the battery 150.

Thus, the system 200 may be configured to periodically sample cell characteristics of an electrochemical cell (e.g., a battery 150) and determine electrochemical cell information from the sampled characteristics. From the electrochemical cell information kinetic performance characteristics of the battery 150 may be determined and incorporated into one or more models of battery performance.

2. Kinetic Performance Analysis

Recent test data for Li-ion cells taken under short constant-current discharge pulses in direct-current (DC) mode show a dependence of cell impedance on current at lower temperatures. The trend is that impedance shows a marked increase as the current density is lowered to a certain value; below that value the impedance is near constant. The observed trend between impedance and current is sometimes loosely classified as "Butler-Volmer (BV) kinetics" behavior, and generally may be system dependent. BV equations allow an examination of interrelationships between current and voltage drop (i.e., overpotential). However, BV equations originally were developed to model idealized highly polished metal electrodes. Newer electrochemical cell materials are not so idealized and are often materials, such as, for example, heterogeneous metal oxides, porous electrode materials, carbon, and other exotic composite materials.

As non-limiting test examples, the discussion herein concentrates on Gen2 Li-ion cells of the 18650 configuration, where these cells consist of a $LiNi_{0.8}Co_{0.15}Al_{0.05}O_2$ cathode (35 μm laminate), a MAG10 carbon anode (also 35 μm laminate), an electrolyte of a 3:7 mass ratio of EC to EMC with 1.2 M $LiPF_6$, and a 2300 series Celgard separator. Of course, embodiments of the present invention may be practiced with many other cell configurations. Conventional BV analysis tends to become inaccurate for these materials. Moreover, conventional BV analysis has been related to static expressions that don't reflect time dependence as the battery is operated.

The BV theory yields the net effective or bulk dependence of current on overpotential. Determining what contributes to the effectual "kinetics" is not so clear in some cases. While it may be clear that the basic or intrinsic charge transfer step contributes to the effective kinetics, there are also other rate limitations tied to poor mass transport in or near the SEI that also impact the charge transfer kinetics. All kinetic limitations can, and are likely to, change over thermodynamic conditions and over aging of an electrochemical cell.

A discussion of relevant BV terms and expressions is useful toward applying a BV model to Li-ion cells. The classic form of the model that relates current density (i) to exchange current density ($i_o$), overpotential ($\eta$), anodic transfer coefficient ($\alpha_a$), and cathodic transfer coefficient ($\alpha_c$) can be represented as:

$$i = i_o \left[ \underbrace{\exp\left(\frac{\alpha_a F \eta}{RT}\right)}_{\text{anodic process}} - \underbrace{\exp\left(\frac{-\alpha_c F \eta}{RT}\right)}_{\text{cathodic process}} \right] \quad (1)$$

where F is the Faraday constant, R is the universal gas constant, and T is temperature in Kelvin. Note that current (I) is the product of current density and electrode surface area (A), that is $I = i_o A$.

The transfer coefficients are defined in terms of the symmetry factor ($\beta$) and the charge transfer stoichiometry (n) to yield:

$$\alpha_a = (1-\beta)n$$

$$\alpha_c = \beta n \quad (2a,b)$$

The ideal value for $\beta$, (denoted $\beta_o$ herein) is generally 0.5, and thus $\alpha_{a,o} = \alpha_{c,o} = 0.5$. Differentiating Equation (1) with respect to overpotential gives the BV expression for impedance in units of Ohms:

$$R = \frac{1}{A}\left(\frac{di}{d\eta}\right)^{-1} = \frac{1}{A}\left\{\frac{Fi_o}{RT}\left[\alpha_a \exp\left(\frac{\alpha_a F \eta}{RT}\right) + \alpha_c \exp\left(\frac{-\alpha_c F \eta}{RT}\right)\right]\right\}^{-1} \quad (3)$$

It is useful to note the meaning and significance of key terms as they relate to Li-ion electrochemical processes, and to correctly apply such terms in suitable expressions. Much of the "classical" electrochemical theory was developed for routine examples of systems that had two distinct reactions occurring (one at each electrode) involving different species (e.g., lead-acid and numerous other examples). However, a considerable question in applying such theory to contemporary Li-ion systems is how the theory should be adapted to a system whose current is driven by the charge transfer reaction of a single species, lithium, within heterogeneous porous electrodes. In the discussion below, the language is first presented in the classical vein. Adaptation to the Li-ion scenario is considered thereafter.

The symmetry factor ($\beta$) may be summarized as the fraction of the potential across a governing interface that promotes a cathodic reaction. By measuring a change in potential, the fraction of expended energy that has been effective in lowering the activation barrier for the electrochemical process can be determined. In other words, over a range when $\beta=0$ none of the energy from the potential has promoted the cathodic reaction, whereas when $\beta=1$ all the energy goes into promoting the cathodic reaction.

In general, a transfer coefficient ($\alpha$) is a measure of the symmetry of the energy barrier of the faradaic process. Thus, $\beta$ is a measure of the efficiency of driving forward the cathodic process, which for the current application is the discharge condition with Li+ charge transfer and intercalation at the cathode. It is then logical to conclude that $\beta$ and the corresponding cathodic transfer coefficient ($\alpha_c$) should have relatively low values (i.e., $\beta$ and $\alpha_c \ll 0.5$) under discharge conditions at low temperature for cases where the cathode SEI impedance is known to be much greater than that of the anode SEI (as per Gen2 data).

For the exchange current density ($i_o$), a large value is characteristic of an electrode reaction that may be reversible. In other words, such an electrode reaction proceeds with little overpotential at high current density. At the opposite extreme, electrode reactions with low exchange current densities may be referred to as irreversible reactions (also referred to herein as sluggish reactions). When an irreversible reaction occurs at an electrode, the electrode is said to be polarizable. The exchange current density ($i_o$) may be a strong function of temperature. The exchange current can be viewed as a kind of "idle current" for charge exchange across the interface and may be considered a measure of the ability of a system to deliver a net current without a significant energy loss due to activation. Balanced faradaic activity can be expressed in terms of the exchange current.

Lastly, overpotential can have numerous sources and can be classified as:

$$E_{loss} = \quad (4)$$

$$\eta = \sum_i \eta_s + \sum_i \eta_{conc} + \sum_i \eta_{Ohm,film} + \eta_{Ohm,electrolyte} + \eta_{Ohm,contract}$$

where each summation includes contributions from both electrodes and:

$\eta_s$: surface overpotential attributed to electrode kinetics, specific to each electrode $\eta_{conc}$: concentration overpotential, tied to mass transfer limitations, specific to each electrode $\eta_{Ohm}$ or $\Delta\Phi_{Ohm}$: overpotential due to electrolyte, electrode films (specific to each electrode, e.g., SEI films), and contact resistance.

In some cases, when one of the electrode processes clearly dominates the other, the weaker process can be neglected and the resultant form of the BV expression reduces a Tafel equation. When electrode kinetics are slow, and significant activation overpotentials are required to allow the flow of current, then good Tafel relationships can be seen, which underscores the idea that Tafel behavior is an indicator of totally irreversible kinetics. At such conditions, the faradaic process is predominantly unidirectional and hence, irreversible. If we assume that the charge transfer rate at higher overpotentials is chiefly limited by processes at or near the location of lithium insertion, then we arrive at two Tafel expressions covering charge and discharge conditions:

$$i_{charge} = i_{o,charge} \exp\left(\frac{\alpha_a F \eta_{charge}}{RT}\right) \quad (5)$$

$$i_{discharge} = -i_{o,discharge} \exp\left(\frac{-\alpha_c F \eta_{discharge}}{RT}\right) \quad (6)$$

The anodic component is negligible under conditions of large negative overpotentials, whereas the cathodic component is negligible at large positive overpotentials.

For a Li-ion application, the β terms may be defined according to anodic or cathodic processes to be consistent and to identify the locus of the charge transfer process at the location of lithium insertion:

$$\alpha_a = \beta_a n$$

$$\alpha_c = \beta_c n \quad (7a,b)$$

which implies that the β terms are assessed according to whether charge or discharge conditions exist. That is, it is possible in some cases for β to vary between charge and discharge conditions.

Under the Tafel-based approach outlined above, it is not necessary for $\beta_a = \beta_c = 0.5$, but rather we should expect $\beta_a \approx \beta_c$, and that $i_{o,charge} \approx i_{o,discharge}$ as elucidated from data regression to the Tafel expressions. The magnitude of the β terms depends on the efficiency of accomplishing the charge transfer process at the intercalative host, as discussed above. For a perfectly balanced Li-ion cell operating entirely reversibly at normal conditions, it should be expected that $\beta_a = \beta_c$ and that these would approach 0.5, and $i_{o,charge} = i_{o,discharge}$.

Finally, transfer coefficients can have effectively low values (α<<0.5) for cases where the governing electrode surface is physically blocked or fouled, which effectively increases the mass transfer resistance at the surface. A low transfer coefficient (α) indicates restricted surface availability for the desired reaction, and will stem from low β terms. By accounting for the effective fraction of surface area availability (θ), then the effective transfer coefficients can be further defined as:

$$\alpha_a = \beta_a n = \theta_a \beta_a n = \theta_a \alpha_{a,o}$$

$$\alpha_c = \beta_c n = \theta_c \beta_c n = \theta_c \alpha_{c,o} \quad (8a,b)$$

where the θ terms could be a function of temperature in cases where the fouling or blockage is caused by thermodynamic phase transitions that occur at the electrode surfaces. It should be noted that data regression that yields a low value of exchange current density ($i_o$) is indicative of sluggish reactions that tend toward electrode polarization. However, having both low exchange current density ($i_o$) and a low transfer coefficient (α) indicates a scenario wherein the electrode kinetics are being impacted by a mass transfer limitation at or very near the electrode surface.

In light of the above developments, various BV expressions can be formulated based on relevant assumptions. A general form is:

$$i = i_o \left[ \exp\left(\frac{\theta_a \alpha_{a,o} F \eta}{RT}\right) - \exp\left(\frac{-\theta_c \alpha_{c,o} F \eta}{RT}\right) \right] \quad (9)$$

while if an overall effective fraction of surface availability is assumed (as f(T))

$$i = i_o \left[ \exp\left(\frac{\theta_{eff} \alpha_{a,o} F \eta}{RT}\right) - \exp\left(\frac{-\theta_{eff} \alpha_{c,o} F \eta}{RT}\right) \right] \quad (10)$$

Lastly, if it is assumed that the overpotential tied to the minor process (opposite of the predominant process acting to promote charge transfer and lithium insertion) is near zero in comparison to the predominant process, then we arrive at:

$$i_{discharge} = i_{o,discharge} \left[ 1 - \exp\left(\frac{-\theta_c \alpha_{c,o} F \eta_{discharge}}{RT}\right) \right] \quad (11)$$

and;

$$i_{charge} = i_{o,charge} \left[ \exp\left(\frac{\theta_a \alpha_{a,o} F \eta_{charge}}{RT}\right) - 1 \right] \quad (12)$$

Equations (11) and (12) may find utility in conditions of noteworthy disparity between electrode-wise overpotentials, as might exist in electrochemical systems at low temperatures where differences in electrode performance can be more profound. However, these expressions may be less accurate at conditions whereby there is less predominance between one electrode process and the other, such as at normal operating temperatures.

Up to this point consideration has not been given to whether the voltage data at each current requires a correction for IR drop (i.e., voltage drop due to current (i) across an electrical impedance (R)). Total impedance determined from the net voltage drop at a current includes the net ohmic IR drop, polarization terms, etc., according to the voltage terms in Equation (4). Thus, inclusion of the IR drop in the voltage data makes it more difficult to assess the true kinetic limitations that emerge from polarization, and hence, an IR correction should be performed on the raw voltage data to provide overpotentials that are appropriate for the Butler-Volmer expression. A simple correction is performed by subtracting $\eta_{ohm}$ from the total η, shown here for Equation (10):

$$i = i_o \left[ \exp\left(\frac{\theta_{eff} \alpha_{a,o} F (\eta - \eta_{ohm})}{RT}\right) - \exp\left(\frac{-\theta_{eff} \alpha_{c,o} F (\eta - \eta_{ohm})}{RT}\right) \right] \quad (13)$$

where:

$$\eta_{ohm} = I R_{ohm} \quad (14)$$

The term $R_{ohm}$ is determined by extrapolating impedance-time pulse data (at temperature) to zero time. Thus, Equation (14) provides a simple linear relationship between $\eta_{ohm}$ and current once $R_{ohm}$ is known.

Similar to Equation (3), the related impedance for the ohmic-adjusted voltage change can be gotten by differentiating Equation (13) with respect to the corrected overpotential $$R = \frac{1}{A}\left(\frac{di}{d\eta}\right)^{-1} = \frac{1}{A} \quad (3b)$$

$$\left\{ \frac{\theta_{eff} F i_o}{RT} \left[ \alpha_{a,o} \exp\left(\frac{\theta_{eff} \alpha_{a,o} F (\eta - \eta_{ohm})}{RT}\right) + \alpha_{c,o} \exp\left(\frac{-\theta_{eff} \alpha_{c,o} F (\eta - \eta_{ohm})}{RT}\right) \right] \right\}^{-1}$$

which in effect is the total or bulk charge transfer impedance.

The charge transfer resistance can be determined by linearizing the BV expression of Equation (13) through a Maclaurin expansion, valid for regions of low η where {i vs. η} is linear:

$$R_{ct} = \frac{1}{A}\left(\frac{\eta - \eta_{ohm}}{i}\right)_{small\ \eta} = \left(\frac{RT}{A i_o F(\alpha_a + \alpha_c)}\right) = \left(\frac{RT}{2 A i_o n F \theta_{eff} \beta_o}\right) \quad (15)$$

where the convention that $\theta_a \approx \theta_c \approx \theta_{eff}$ has been maintained. The charge transfer resistance can be calculated based on the two BV parameters (exchange current density $i_o$ and electrode surface availability $\theta_{eff}$) determined from regression analysis. Note that charge transfer resistance ($R_{ct}$) tends toward infinity as the product ($i_o*\theta_{eff}$) goes to zero, a correct result.

A significant reference condition is found by setting $\theta_{eff}$ to unity, representing full surface utilization for the charge transfer reaction(s), and hence the absence of additional mass transport limitations at the electrode surface:

$$R_{ct}^o = \left(\frac{RT}{Ai_o F(\alpha_{a,o} + \alpha_{c,o})}\right) = \left(\frac{RT}{2Ai_o nF\beta_o}\right) \quad (16)$$

This term represents the intrinsic or isolated charge transfer resistance.

Thus, Equations (15) and (16) can be used to estimate the following quantities:

{Total or apparent charge transfer resistance from bulk data, per BV parameters} = $R_{ct}$ (17)

{Isolated charge transfer resistance for the true kinetic contribution of the electrodes} = $R_{ct}^o$ (18)

{Charge transfer resistance attributed to mass transfer limitations at critical electrodes interfaces (e.g., SEI)} = (19)

$$R_{ct}^{mt} = (R_{ct} - R_{ct}^o) = \left(\frac{RT}{2Ai_o nF\beta_o}\right) = \left(\frac{1}{\theta_{eff}} - 1\right)$$

Figure 6:
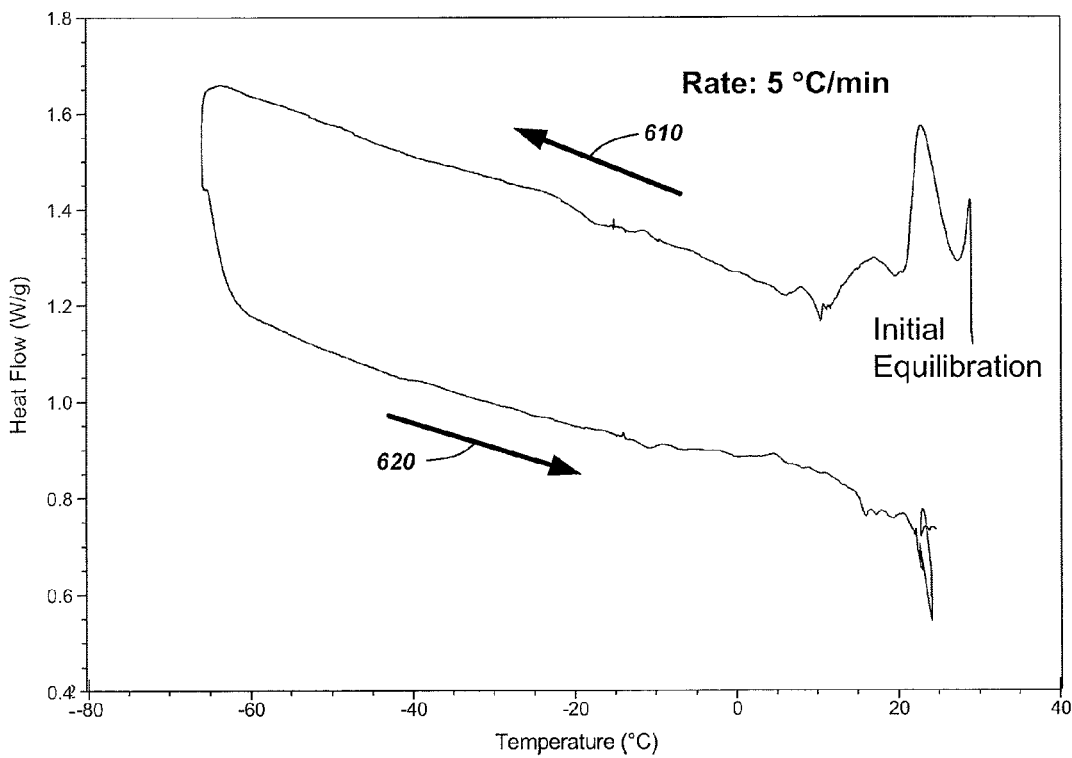
FIG. 6 illustrates results of Differential Scanning Calorimetry (DSC) analysis performed over a large matrix of samples comprised of an electrolyte coupled with various combinations of cell materials.

As will be seen in later discussions, the sum $\{R_{ohm}+R_{ct}\}$ gives a very good estimate of the total resistance at the exchange current density where the impedance plateau is seen in FIG. 6, while the sum $\{R_{ohm}+R_{ct}^o\}$ is close to the total resistance at the highest currents investigated herein. The difference in resistance between these two extremes, as given in Equation (19), represents a mass transfer energy barrier that must be overcome to achieve the higher currents. This energy barrier is manifest by larger voltage drops at higher discharge currents (as show in FIGS. 4A and 4B).

In the following analysis, discharge pulse data at −20° C. for Gen2 18650 cell "15" is investigated via the modeling framework described above. Of course, this analysis is to illustrate application of the modeling framework described above to a specific battery cell as an example. The modeling framework may be applicable to many other battery types and battery chemistries.

In the analysis, pulses were performed for a total duration of 10 seconds each, but attention is presently restricted to the first 4 seconds of each pulse. One hour rests were allowed between pulses to eliminate cumulative heating effects. At first, regression of the data to the BV model included both process terms in Equations (1) and (3). However, poor fits to the data were obtained, since the anodic contribution skewed the results into producing a significant local maximum in the low current range. The anodic term was then removed (per Tafel approach), and the regression was repeated, using as the basis impedance and overpotential data and Equation (6).

Figure 3A:
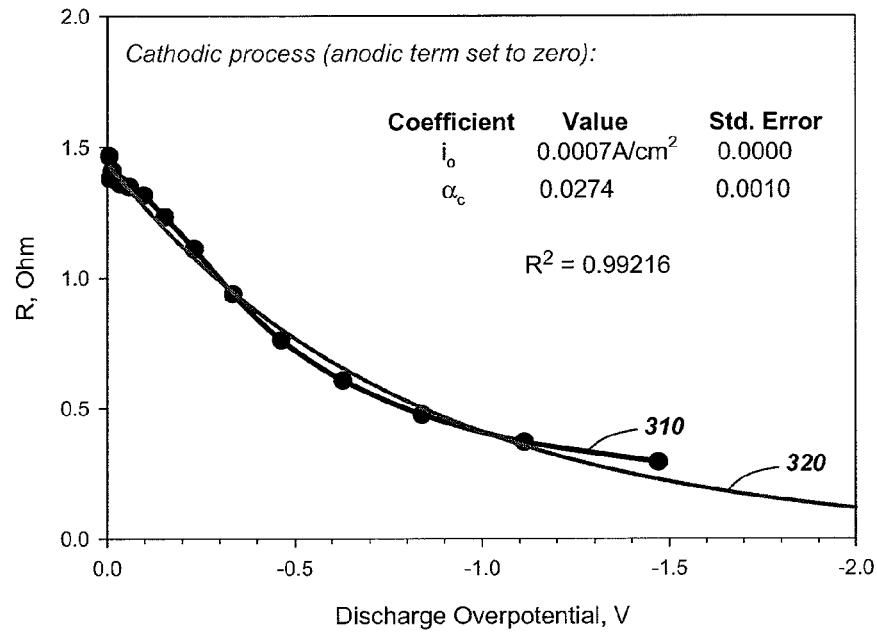
FIG. 3A compares experimental data and Tafel-based model results, showing a good correlation between data and model predictions over the entire range of the experimental data.

FIG. 3A compares experimental data 310 and Tafel-based model results 320, showing a good correlation between data and model predictions over the entire range of the experimental data. In other words, the regression for the Tafel-based model results 320 assumes the cathodic process dominates and the anodic term of the BV model is set to zero. The resultant regression gives low values for both the cathodic transfer coefficient ($\alpha_c$) and the exchange current density ($i_o$). Even though the regression results appear to model the data accurately, consideration should be given to whether the regression values are valid and physically realistic.

Figure 3B:
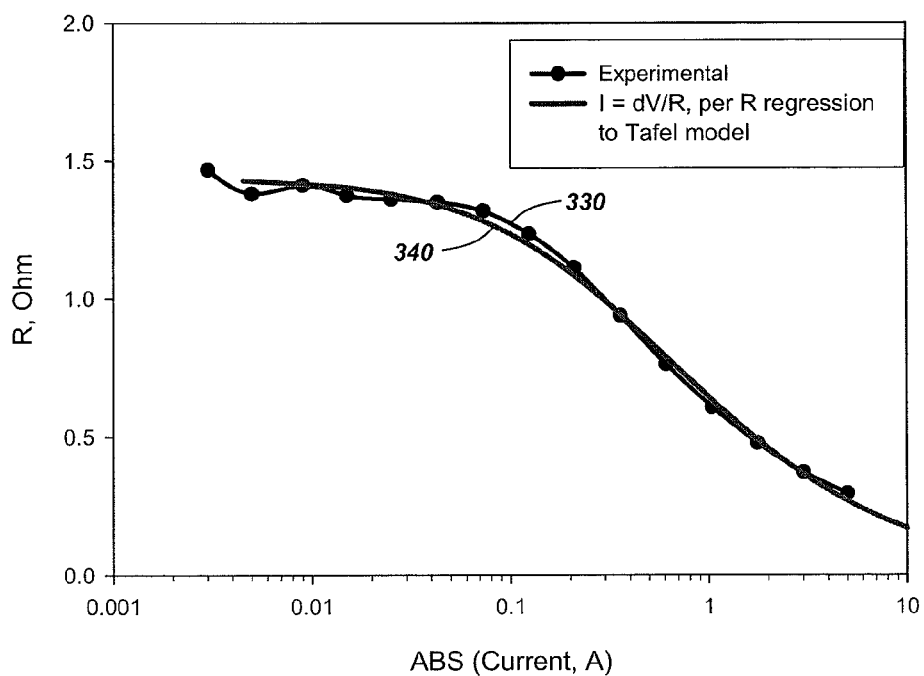
FIG. 3B shows R versus total current, where R is the regression from FIG. 3A and current was calculated from the model values $\eta/R$.

FIG. 3B shows experimental current 330 versus modeled current 340 as I=dV/R, where R is the regression from FIG. 3A and current was calculated from the model values $\eta/R$. Note that for this analysis, the convention was followed whereby anodic currents and overpotentials are positive, and cathodic currents and overpotentials are negative.

Figure 4B:
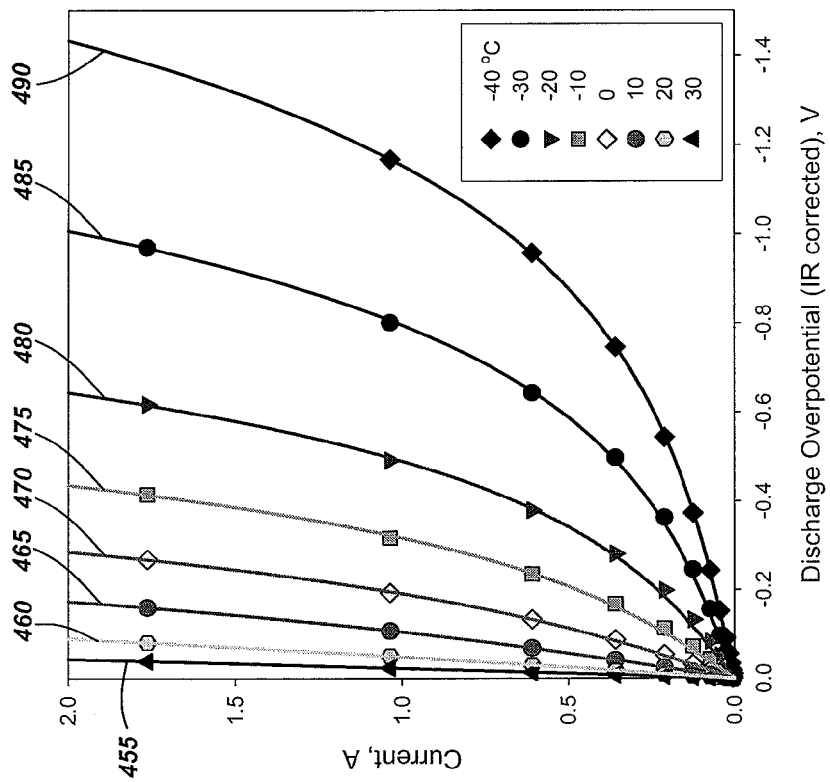
FIGS. 4A and 4B illustrate pulse data and BV-based regression data for two cells with different aging characteristics.
Figure 4A:
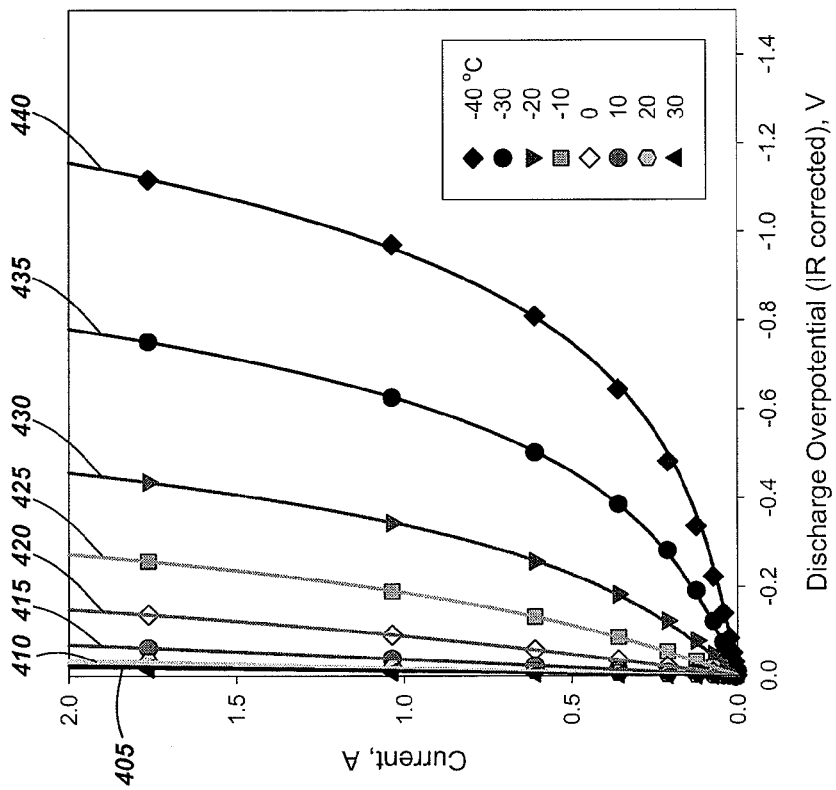

FIGS. 4A and 4B illustrated pulse data and BV-based regression data for two cells with different aging characteristics. Equation (13) was used to regress 4-second pulse data over eight temperatures for two other 18650 cells: one of relatively low aging (cell 80, 16%-20% power fade, FIG. 4A), and one of moderately high aging (cell 14, 50%-55% power fade, FIG. 4B). Pulse data and BV-based regression results are given for these two cells, where correlation coefficients ($R^2$) exceed 0.999 in all but one case. In FIGS. 4A and 4B, the symbols represent data, and the corresponding solid lines represent regression results obtained with the modified Butler-Volmer model as described by Equation (13) at a series of temperatures ranging from −40° C. to 30° C. Thus, for the relatively low aging cell of FIG. 4A data points and regression curves are show for temperatures of −40° C. (405), −30° C. (410), −20° C. (415), −10° C. (410), 0° C. (425), 10° C. (430), 20° C. (435), and 30° C. (440). Similarly, for the moderately high aging cell of FIG. 4B data points and regression curves are show for temperatures of −40° C. (455), −30° C. (460), −20° C. (465), −10° C. (470), 0° C. (475), 10° C. (480), 20° C. (485), and 30° C. (490).

Figure 5:
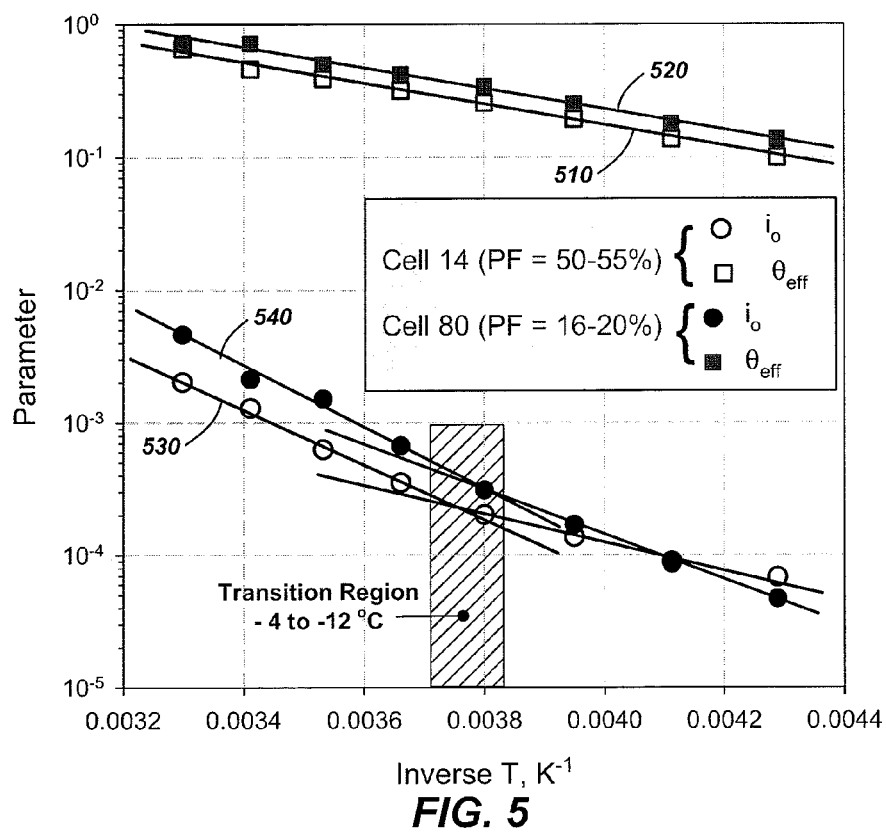
FIG. 5 shows the regression parameters (from Equation 13 below), namely exchange current density ($i_o$) and electrode surface availability ($\theta_{\mathit{eff}}$), which were used in generating the graphs of FIGS. 4A and 4B.

FIG. 5 shows the regression parameters from Equation (13), namely exchange current density ($i_o$) and electrode surface availability ($\theta_{eff}$), which were used in generating the graphs of FIGS. 4A and 4B. The exchange current density (units $A/cm^2$) is seen to be a strong function of temperature, where exchange current density ($i_o$) drops with decreasing temperature as seen in curve 530 for cell 15 and curve 540 for cell 80. Both cells exhibit a transition region where the exchange current density ($i_o$) activation energy changes as temperature reaches the range of −4° to −12° C. This transition region is in very good agreement with that seen for general performance of these Li-ion cells.

The results in FIG. 5 also reveal that the electrode surface availability ($\theta_{eff}$) decreases at lower temperatures, yielding lower effective transfer coefficients at colder conditions as seen in curve 510 for cell 15 and curve 520 for cell 80. The effective range of $\theta$ electrode surface availability ($\theta_{eff}$) is about 0.10 to 0.72, which is reasonable considering the ideal maximum value of unity. Although the exact physical causes for a decrease in electrode surface availability ($\theta_{eff}$) over temperature are unclear, candidates include thermodynamic phase behavior of electrolyte at critical interfacial regions (double-layer DL and SEI), interaction of electrolyte in constrained porous SEI regions, phase interaction of electrolyte with separator surfaces, and glass transition temperature of SEI films. Also, regarding the BV parameters with respect to relative cell aging, the model trends represent a correct physical interpretation: exchange current density ($i_o$) and electrode surface availability ($\theta_{eff}$) both decrease with increased cell aging, indicating diminished electrochemical efficiency.

A significant aspect in using BV for Li-ion cell data is to realize that the transfer coefficients must be defined in terms of the effective electrode surface availability and that the relevant electrochemical process toward charge transfer, whether cathodic or anodic, can become limiting at the locus of charge transfer. The regression parameters from FIG. 5 clearly indicate that electrode surface availability ($\theta_{eff}$) and exchange current density ($i_o$) are both lower at colder temperatures. This relationship is consistent with a physical model that asserts that a governing electrode surface can be physically blocked or fouled due to a thermodynamic phenomenon occurring at low temperature, which effectively increases the mass transfer resistance at the surface. This phenomenon is seen by effective transfer coefficients that have low values ($\alpha<<0.5$). Low transfer coefficients ($\alpha$) indicate restricted surface availability for the desired reaction, as has been noted in the literature (see, for example: (1) J. Wang and J. Farrell, *J. Appl. Electrochemistry*, vol. 35, pp. 243-248 (2005), and (2) M. H. P. Santana, L. A. De Faria, J. F. C. Boodts, *Electrochem. Acta*, vol. 50, pp. 2017-2027 (2005)). Having both low exchange current density ($i_o$) and low transfer coefficients ($\alpha$) (per low surface area availability ($\theta$)) indicates a scenario wherein the electrode kinetics is being impacted by a mass transfer limitation at or very near the electrode surface. Thus, in this way the BV model can help characterize conditions under which mass transport limitations are occurring in relation to the electrode kinetics.

In one sense, the modeling results should be expected. That is, as current is reduced to near-zero levels, the available power is less able to overcome fundamental or intrinsic mechanisms at or near critical interfaces that impact the efficiency of charge transfer, and thus, impedance will increase. With the cells used as examples, the intrinsic mechanisms appear to be linked to lithium desolvation and perhaps lithium transport through porous regions, and are more evident in impedance determined at near-equilibrium pulse conditions. These mechanisms represent a finite energy barrier, and hence we see a plateau reached in impedance at lower currents in FIG. 3B, for example. Additionally, the general framework of the Butler-Volmer or Tafel models allow the possibility of a thermodynamic phenomenon that adversely affects impedance at or near the SEI or DL, such as SEI pore clogging with electrolyte pseudo phases.

The occurrence of a relatively low exchange current density ($i_o$) for the data in FIGS. 3A, 4A, and 4B could be partly a consequence of solvent accumulation at the cathode double layer region during discharge conditions. Such an accumulation of co-transported solvent in cathode-side DL regions would cause a corresponding stagnation of lithium ions through increasing the desolvation requirements at the SEI, thereby reducing the flux of Li$^+$ into the active material, and yielding an apparent low kinetic rate of charge transfer. This behavior has been independently verified by molecular-scale transport modeling, and is one example of how the rate of charge transfer can be lowered by a mass transport limitation.

There is ample evidence in the literature that Li-ion battery materials such as carbons can promote phase separation of electrolyte components at temperatures higher than their equilibrium "test tube" values. For example, Ding et al. (S. P. Ding, K. Xu, S. S. Zhang, T. R. Jow, K. Amine, G. L. Henriksen, *J. Electrochem. Soc.*, vol. 146 (11), pp. 3974-3980, (1999)) looked at the effect of carbon type, carbon concentration relative to electrolyte, and salt concentration in electrolytes containing EC:EMC at 1:1 by weight. They found clear correlations between the increase of the primary crystallization temperature ($T_{PC}$) they attributed to formation of EC-rich phases and the relative amounts of carbon and salt, considering both DSC and conductivity data. In a dynamic cell environment during a pulse, there will be shifts of electrolyte concentration at critical interfacial regions, and thus, local $T_{PC}$ are possible, resulting in local regions of electrolyte phase separation. For a discharge pulse, this will occur at the cathode DL/SEI region where the electrolyte becomes depleted. Regardless of whether such phase events happen under static or pulse conditions, a result will be hindrance of Li$^+$ ingress/egress through the blockage of a fraction of pathways by some form of precipitant. This consequence appears to be well described by trends in the electrode surface availability ($\theta_{eff}$) and exchange current density ($i_o$) data given above.

FIG. 6 illustrates results of Differential Scanning Calorimetry (DSC) analysis performed over a large matrix of samples comprised of an electrolyte (of three types) coupled with various combinations of cell materials harvested from formed and previously cycled Li-ion coin cells. DSC analysis can help detect the phase transformations of cell materials discussed above. The equipment used was a TA Instruments Model 2910 Differential Scanning Calorimeter, scanning at 5° C./minute. Using the same Gen2 electrolyte that was used in the aforementioned 18650 cells, DSC results show a steady exothermic slope upward 610 over a broad temperature range as temperature decreases, then a commensurate slope downward 620 as the temperature increases. The magnitude of the heat release is approximately three times greater than would be seen for simple heat capacity (i.e., latent heat effects), indicating the presence of one or more contributive thermodynamic processes. One way to interpret the results of FIG. 6 is to assign the behavior to a "slow" thermal process involving the interaction of electrolyte with the porous regions of the electrode materials. Simply stated, the DSC results infer that electrolyte phase transition(s) are occurring at or near porous regions at a greater extent as the temperature is lowered. In the porous realm, "phase transitions" may be considered to range from the simple process of greater solvent adsorption and ordering on pore surfaces to crystallization of salt or solid solvates. It should be noted that the near-linear thermal signature of FIG. 6 corresponds in good measure with the linearity of electrode surface availability ($\theta_{eff}$) over temperature in FIG. 5. Thus, FIGS. 5 and 6 appear to be pointing at the same mechanism for the drop in low-temperature performance: the loss of effective transport area at the electrodes (as represented by log $\theta_{eff}$) due to occlusion of porous regions by electrolyte phase transitions. Such mechanisms could help explain the high activation energy tied to SEI films, as observed in Electrochemical Impedance Spectroscopy (EIS) real-axis semi-circle widths (per Nyquist plots) over temperature. Whether these mechanisms happen within the SEI or between primary particles is a relevant question.

Figure 7:
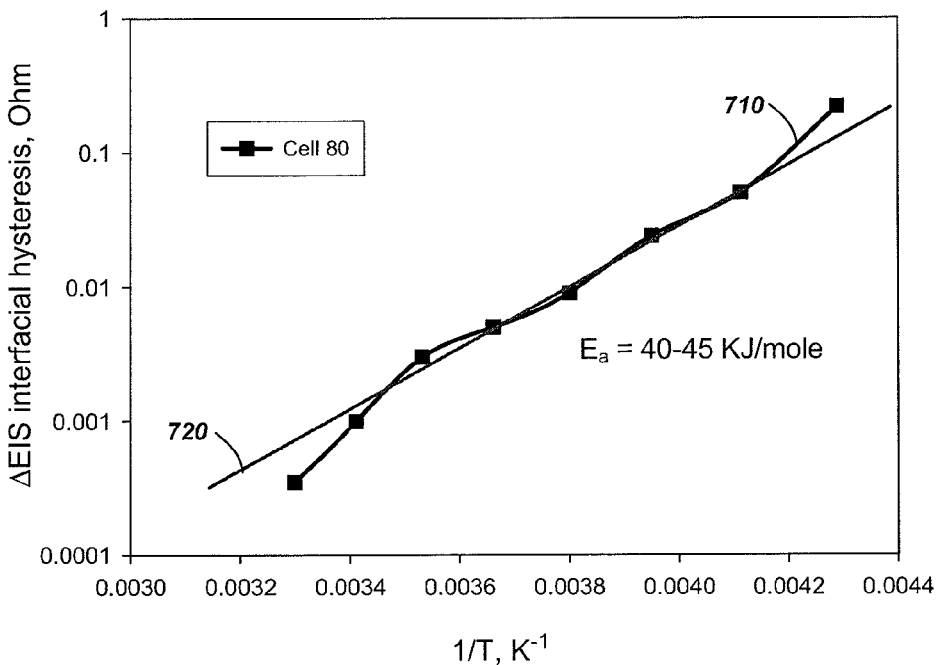
FIG. 7 illustrates hysteresis of Electrochemical Impedance Spectroscopy (EIS) semicircle widths represented as an Arrhenius plot.

FIG. 7 illustrates hysteresis of EIS semicircle widths represented as an Arrhenius plot for Gen2 cell 80. This hysteresis may be considered another indicator of probable thermodynamic behavior and illustrates the difference in impedance between heating and cooling legs. The experimental protocol had the cells start from 30° C., whereupon they were cooled through successively cooler temperatures to −40° C., then the reverse was performed in a heating leg. Cells were allowed to reach thermal equilibrium between EIS measurements. The hysteresis is then the difference in the real-axis semicircle widths between cooling and heating legs at a specified temperature. Data points are illustrated by line 710. The trend 720 is strong over temperature, clearly showing that interfacial impedance grows as a cell is effectively held at a cold temperature for a prolonged period. It can be suggested that such a time dependence is related to maturation of the thermodynamic processes discussed above regarding solvent interactions with electrode surfaces.

Another possible mechanism for explaining part or all of the reduction of cell resistance as current is increased at a given temperature is based on the concept of solvent repulsion under the effective electrode surface charge (and SEI region potential) that is present over current. Under discharge conditions, the effective surface charge of the cathode is negative due to the population of electrons migrating to participate in the charge transfer process. If solvent molecules possess a more strongly defined negative dipole than positive, a negative expressed surface charge will act to repulse solvent away from the surface, and will do so in relation to the magnitude of the charge and distance from the surface. Since the cathode surface charge would be greater at greater currents (as electron flux is greater within the solid state), then solvent repulsion would increase commensurately, and open up the surface and immediate porous regions to more direct ingress of lithium. For high enough currents at a given temperature, this could produce total charge transfer impedances approaching the intrinsic value ($R_{ct,o}$), which is readily observed in analysis of discharge pulse data. Conversely, for low currents the effective surface charge is incapable of maintaining a repulsive force to overcome the interfacial energy barrier ($\Delta E_{int}$) tied to phenomena such as solvent-to-surface chemi-sorption or physi-sorption. Hence, in this context the exchange current density ($i_o$) also marks where the magnitude of the surface charge is sufficient to start showing measurable benefit in overcoming the interfacial energy barrier ($\Delta E_{int}$). Also, surface morphology should be expected to play a role in this overall process, since surface irregularities can yield localized areas of higher and lower surface charge, and hence, variations in solvent repulsion. This overall mechanistic description holds much merit in that it does not require much if any of a lag time to transpire. The pulse data clearly shows that impedance at current does not exhibit a maximum over pulse duration, as could be seen if a transient process such as phase transformation (e.g., melting of a solid precipitate) was taking place and affecting local resistance within interfacial regions. Lastly, charge conditions will produce an analogous process at the anode surface, and comparison between charge and discharge pulse data could reveal more information about differences in SEI surface features between the anode and cathode.

Joule heating of SEI films is another contributing factor that can help explain the reduction of cell impedance at higher currents. Generally being the locus of the highest impedance within a Li-ion cell, SEI regions will experience localized heat generation disproportionately higher than other cell components. If Joule heating is the predominant reason for lowered impedance at higher current, then there has to be something regarding the character of the SEI that is highly susceptible to the effect of heating. This explanation points squarely to thermodynamic phenomena such as electrolyte phase changes, increased solvent adsorption or ordering in porous regions, and glass transitions of the SEI. The fact that the SEI is heated may have little effect on cell performance unless there are temperature-sensitive processes there that govern SEI transport performance.

In addition to the issues of thermodynamic phase transitions of the electrolyte, the SEI structure itself might be prone to one or more glass transition temperatures, causing an alteration of SEI transport properties with temperature. A highly heterogeneous SEI could undergo several transitions. Upon pulsing at higher and higher currents, Joule heating of the SEI film would drive the SEI to reside in different thermodynamic states and possibly reduce the presence or effect of the glass transition regions. This explanation is also in agreement with the exchange current density ($i_o$) and electrode surface availability ($\theta_{eff}$) trends observed from data regression. Realistically, the overall behavior of SEI films over temperature and current could be a combination of factors, and it would be a complicated endeavor to quantify and separate each of the contributing mechanisms. Based on the above mechanistic discussions, the relationship of impedance to current and overpotential at low temperatures can now be considered.

Figure 8:
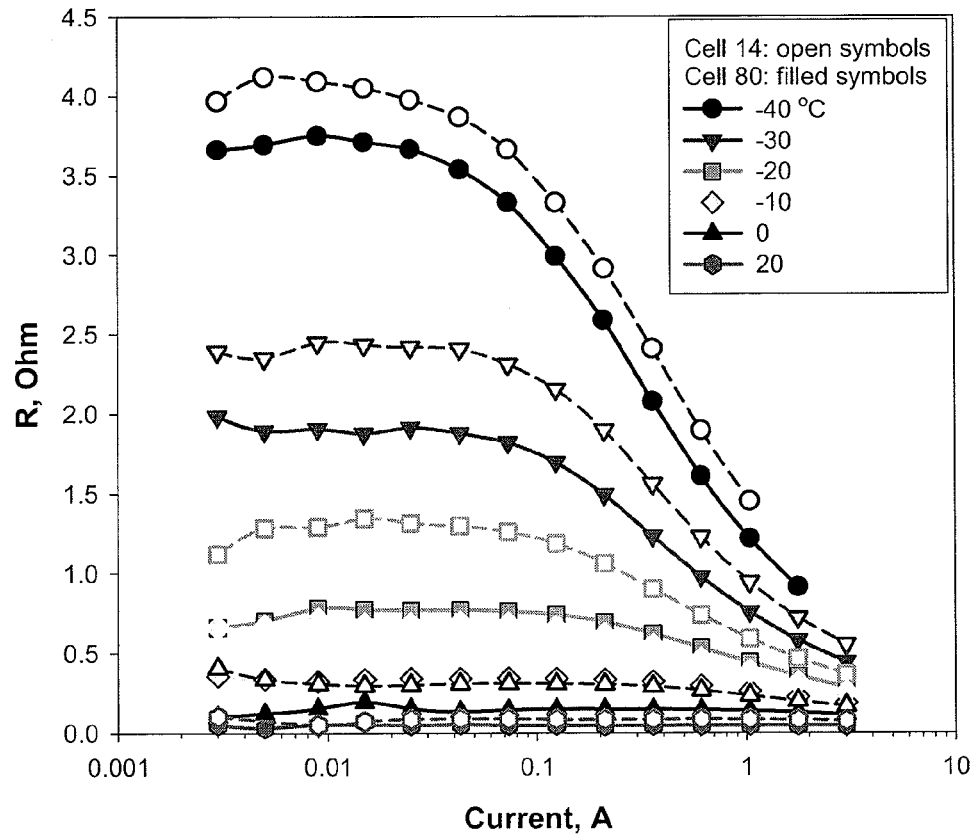
FIG. 8 illustrates impedance profiles showing a significant drop in impedance as current is increased at various temperatures.

FIG. 8 illustrates impedance profiles showing a significant drop in impedance as current is increased at various temperatures. Data is shown for cell 14 (shown as open symbols) over various temperatures ranging from −40° C. to 20° C. Similarly, data is shown for cell 80 (shown as filled symbols) over various temperatures ranging from −40° C. to 20° C. Recall that cell 14 had moderately high aging and cell 80 had relatively low aging.

A simple explanation for this significant drop in impedance is that an increase in current past a limiting activation current acts to disrupt the phases, pseudo-phases, or glass transitions that affect the porous regions, thus allowing a lowering of impedance due to improved lithium transport through the pores. The magnitude of current would be expected to have a commensurate effect on the extent of phase disruption. This description finds merit in at least three ways: (1) the phases or pseudo-phases contain solvent which could become involved in solvating lithium passing by, thus eroding the solid phase to a greater extent at greater current; (2) those phases containing lithium ions would become unstable since some of the ions would egress from the solid phase under the action of the cell potential gradient; and (3) Joule heating of the interface is thermodynamically favorable toward eliminating nuisance solid phases or SEI glass transitions. For the pulses considered herein calculations were done that infer that an appreciable Joule heating effect may be taking place, especially for upper-range currents as seen in FIG. 8. Also, FIG. 8 shows that higher impedance cells of greater aging (e.g., cell 14) show a slightly steeper slope relative to cells of lesser aging (e.g., cell 80), possibly indicating a greater heat generation due to the higher cell impedance. Lastly it is interesting to note that when the exchange current densities ($i_o$) for cell 80 given in FIG. 5 are multiplied by the true electrode area of 846.3 cm$^2$, there is excellent agreement between the resultant currents and those corresponding to the primary inflections seen in FIG. 8 (limiting activation currents).

Figure 9B:
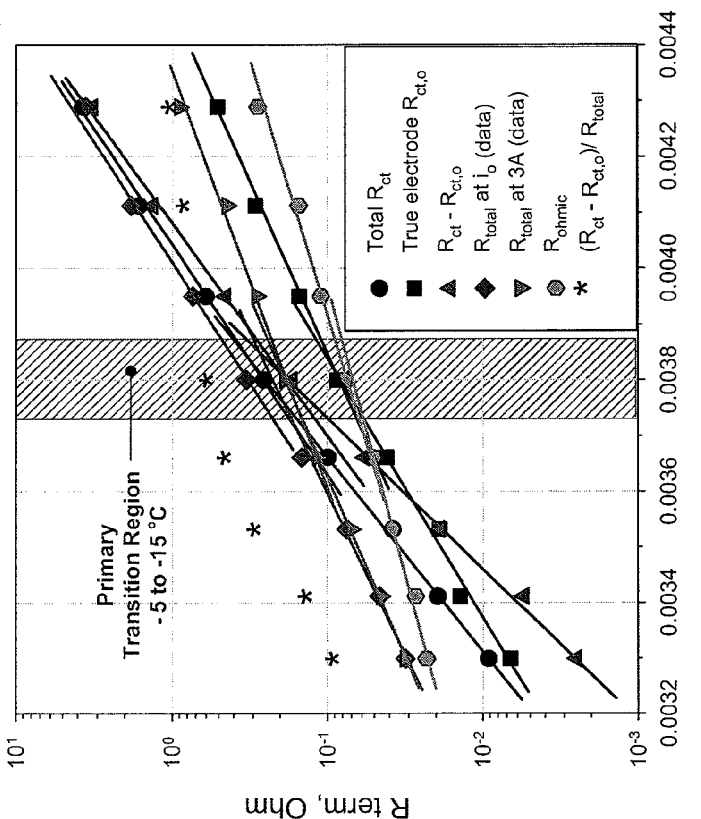
FIGS. 9A and 9B illustrate Arrhenius-type plots of some constituent resistance terms for impedance relative to temperature for cell 14 and cell 80, respectively.
Figure 9A:
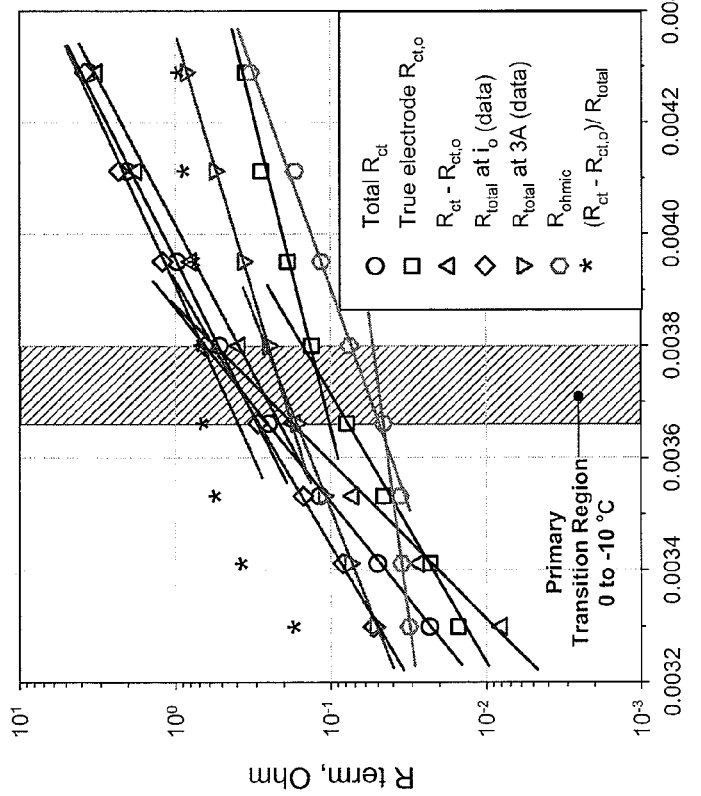
Figure 10B:
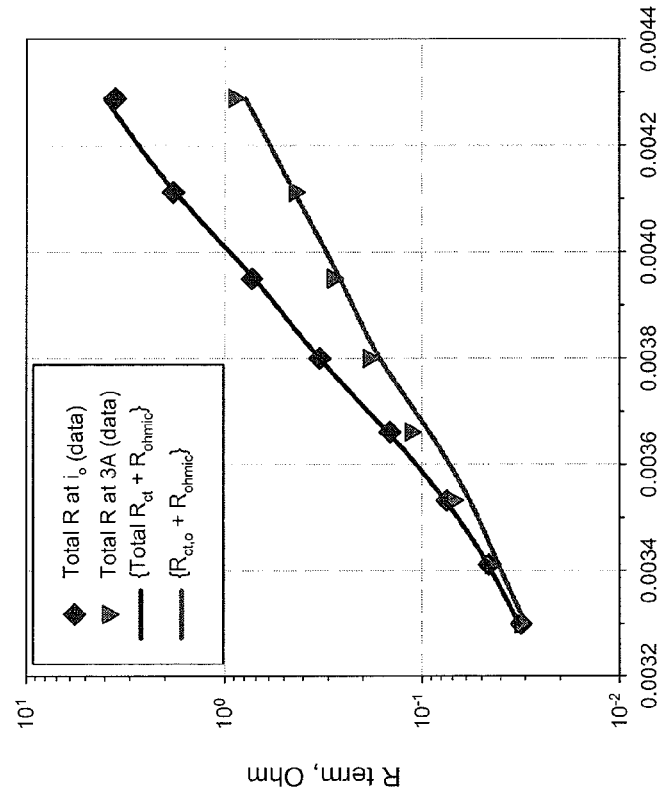
FIGS. 10A and 10B illustrate Arrhenius-type plots of additional constituent resistance terms for impedance relative to temperature for cell 14 and cell 80, respectively.
Figure 10A:
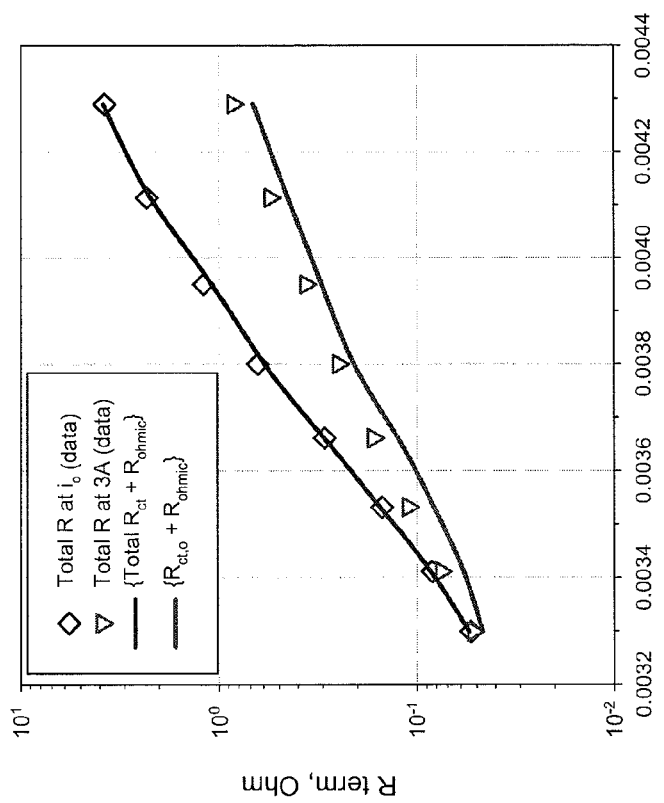

FIGS. 9A and 9B illustrate Arrhenius-type plots of some constituent resistance terms for impedance relative to temperature for cell 14 and cell 80, respectively. FIGS. 10A and 10B illustrate Arrhenius-type plots of additional constituent resistance terms for impedance relative to temperature for cell 14 and cell 80, respectively. These plots summarize a detailed analysis of constituent resistance terms for cells 14 and 80 that was performed using Equations (15-19). Of note in these figures is that charge transfer resistance ($R_{ct}$) (per Equation 15) clearly dominates the total resistance at lower temperatures. When the charge transfer resistance ($R_{ct}$) is cast into its constituent terms, it is seen that as temperature is lowered, $R_{ct}^{mt}$ (charge transfer resistance attributed to mass transfer limitations) dominates and $R_{ct}^{o}$ (charge transfer resistance attributed to intrinsic kinetics) is a minor contributor.

FIGS. 9A and 9B illustrate transition regions that vary slightly between cells and generally fall within the range of −5° C. to −15° C. In part, these transitions appear to mirror mechanistic shifts that represent the effect of mass transport limitations on the various impedance terms. For most of the data shown in FIGS. 9A and 9B the trends indicate that at the chosen pulse conditions, a higher activation energy is manifest at the warmer temperatures (0° C. to 30° C., about 0.00366 to 0.0033 K$^{-1}$), then undergoes a modest decrease at the transition. Such trends infer that the governing mechanisms promote increases in impedance as the temperature is lowered, but that the effect is finite and starts to taper or plateau past the transition region.

FIGS. 10A and 10B clearly shows that the total resistances at exchange current density ($i_o$) versus 3 A current can be accurately rendered by summing $R_{ohmic}$ with the appropriate charge transfer terms. The slight under-prediction of total resistance at 3 A is possibly due to the emergence of concentration overpotential at this higher current, or perhaps that the $\alpha_o$ terms for transfer coefficients are not fully attained at 3 A, per Equation (16).

Although the model analysis given above is for 4-second discharge pulse data, analysis of the 10-second data discussed below will show a greater influence of mass transport limitations. A comparison of the 4 and 10-second data will reveal the influence of pulse duration on model parameters, most notably exchange current density ($i_o$).

Figure 11:
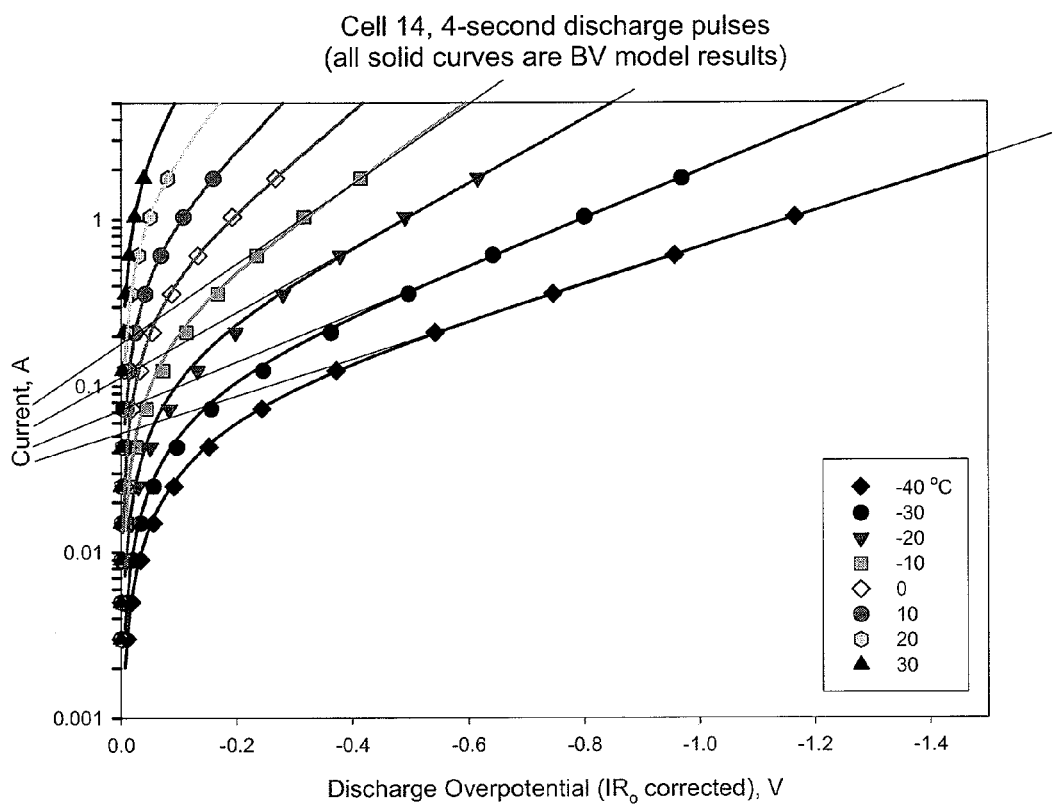
FIG. 11 illustrates Tafel plots relative to BV-based model results at various temperatures.

FIG. 11 illustrates Tafel plots relative to BV-based model results at various temperatures. From the close correlation between model results and data, it is clear that the Tafel plot extrapolations yield exchange current density ($i_o$) values in very close agreement to those obtained by regression with a modified Butler-Volmer expression ($\theta$–BV). This correlation is further evidence of the validity and accuracy of the BV approach used herein. In addition, the model structure applies equally to charge and discharge pulses and can be adapted to constant power pulses instead of constant-current pulses.

The following development maintains the basis of constant-current DC pulses, but also may be treated to consider charge pulses and variable-current pulses. For arbitrary constant-current pulse conditions, the total overpotential due to the apparent overall charge transfer process can be denoted as $\eta_{ct}=(\eta-\eta_{ohm})$, and then the modified Butler-Volmer expression ($\theta$–BV) becomes:

$$\frac{i}{i_o} = \exp\left(\frac{\theta_{\mathit{eff}}\alpha_{a,o}F\eta_{ct}}{RT}\right) - \exp\left(\frac{-\theta_{\mathit{eff}}\alpha_{c,o}F\eta_{ct}}{RT}\right) \quad (20)$$

or simply:

$$\frac{i}{i_o} = \exp(\chi\eta_{ct}) - \exp(-\chi\eta_{ct}) \quad (21)$$

A hypothetical limit term may be introduced and expressed as:

$$M_\eta(i) = \lim_{t_{pulse}\to large}(\eta_{ct})_i \text{ where } i_o \to i_o^* \quad (22)$$

where the resultant term is imposed to be effectively free of effects from Joule heating and concentration polarization (or that these effects counteract each other). In other words, $M_\eta(i)$ is the theoretical maximum overpotential at an arbitrary current density (i) that is due solely to the effective charge transfer kinetics at the temperature of interest. Note that at sufficiently large pulse time, the exchange current density ($i_o$) approaches a low limiting value, denoted here as $i^*_o$, as observed in the plateauing of the exchange current density ($i_o$) in pulse data (as in FIG. 13 below). Thus, at sufficiently high pulse time we have the special case of the modified Butler-Volmer expression ($\theta$–BV):

$$\frac{i}{i_o^*} = \exp(\chi M_\eta(i)) - \exp(-\chi M_\eta(i)) \quad (23)$$

Figure 12:
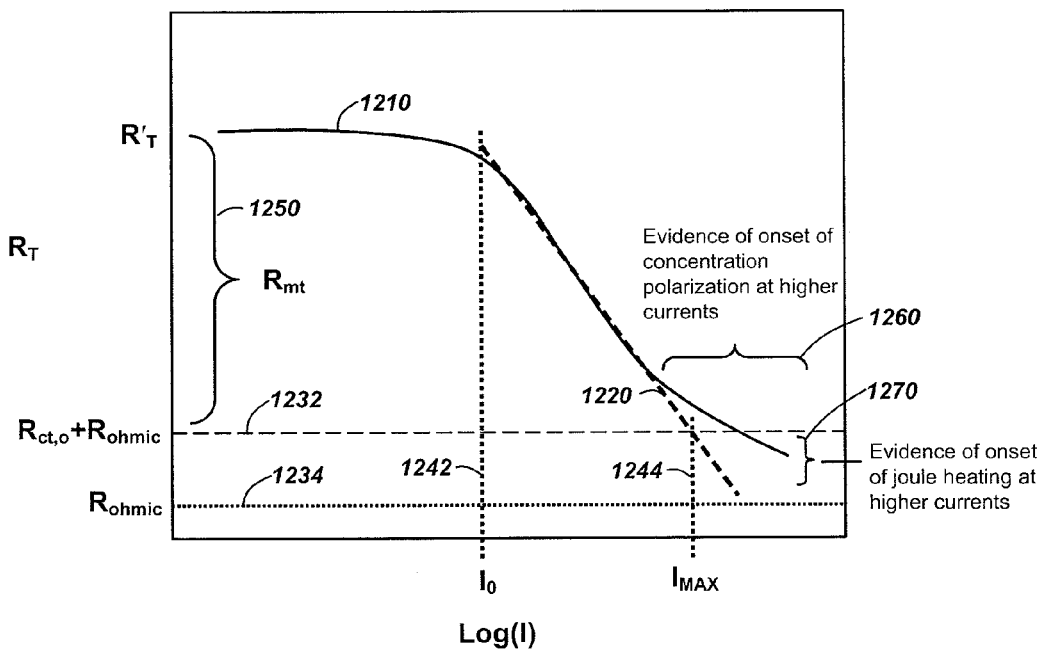
FIG. 12 illustrates a generalized profile for total impedance versus log current.

FIG. 12 illustrates a generalized impedance profile 1210 for total impedance versus log current. An analysis of the impedance profile 1210 over current may be performed under arbitrary conditions of temperature, pulse duration, and cell aging. Some interesting values for impedance $R_T$ are illustrated as $R_{ohmic}$ 1234, $R_{ct,o}+R_{ohmic}$ 1232, $R_{mt}$ 1250 as the difference between $R'_T$ and $R_{ct,o}+R_{ohmic}$ 1232. Along with the impedance profile 1210, FIG. 12 also indicates a linear region 1220 that resides between $I_o$ (1242) and $I_{max}$ (1244), where $I_{max}$ (1244) is the current at which $R_{total}$ equals the sum of $R_{ohmic}$ and $R_{ct,o}$, indicating that the mass transport contribution of impedance (beyond that which is due to charge transfer kinetics) has been reduced to zero. The magnitude and shape of the impedance profile 1210 in FIG. 12 and the relative positions of $I_o$ (1242) and $I_{max}$ (1244) are dependent on conditions of interest involving temperature, pulse duration, cell aging, and cell chemistry. Region 1260 indicates evidence of onset of concentration polarization at higher currents. Region 1270 indicates evidence of onset of Joule heating at higher currents.

From FIG. 12 the thermodynamic energy barrier tied to mass transport limitations can be expressed in terms of the voltage difference within the shown linear region:

$$\frac{\Delta E_{th}^{ref}}{nF} \stackrel{!}{=} \Delta V_{mt} = I_{max}(R_{ct,o}^* + R_{ohmic}) - I_o^*(R_{ct}^{mt,*} + R_{ct,o}^* + R_{ohmic}) \quad (24)$$

$$= I_{max}(R_{ct,o}^* + R_{ohmic}) - I_o^*(R_{ct}^{total,*} + R_{ohmic})$$

where the star (*) notation identifies quantities at a sufficiently high or mature pulse time, as was discussed above.

From Equations (15) and (16) we have:

$$R_{ct}^{total,*} = \frac{R_{ct,o}^*}{\theta_{\mathit{eff}}} \quad (25)$$

Substituting for the charge transfer terms gives:

$$\frac{\Delta E_{th}^{ref}}{nF} \stackrel{!}{=} I_{max}\left(\frac{RT}{nFI_o^*} + R_{ohmic}\right) - I_o^*\left(\frac{RT}{nFI_o^*\theta_{\mathit{eff}}} + R_{ohmic}\right) \quad (26)$$

and with rearrangement we can obtain:

$$I_{max} = \left(\frac{\Delta E_{th}^{ref}}{nF} + \frac{RT}{nF\theta_{\mathit{eff}}} + I_o^*R_{ohmic}\right)\left(\frac{RT}{nFI_o^*} + R_{ohmic}\right)^{-1} \quad (27)$$

Implied in the preceding development is the correct use of sign for overpotential, current, and thermodynamic energy barriers, and care is required to achieve a consistent basis. Finally, at $I_{max}$ we can define the relevant non-ohmic overpotential as:

$$M_\eta^* = I_{max} R_{ct,o}^* = \frac{I_{max}}{I_o^*} \frac{RT}{nF} \quad (28)$$

Which results in the modified Butler-Volmer expression (θ–BV):

$$\frac{i_{max}}{i_o^*} = \frac{I_{max}}{I_o^*} = \exp(\chi M_\eta^*) - \exp(-\chi M_\eta^*) \quad (29)$$

A solution procedure to determine the foremost parameters may be defined as follows:

1. At the temperature of interest, estimate values for $R_{ohmic}$ and electrode surface availability ($\theta_{eff}$) as, for example, through an Arrhenius relationship ($R_{ohmic}$ can also be determined by extrapolating pulse impedance back to zero pulse time).
2. Assume a value of $\Delta E_{th}^{ref}$, which will be a function of temperature and cell aging.
3. Guess $I_o^*$ (or $i_o^*$).
4. Calculate $I_{max}$ from Equation (27).
5. Calculate $M_\eta^*$ from Equation (28).
6. Calculate RHS of Equation (29).
7. Compare LHS versus RHS of Equation (29).
8. Repeat acts 3-7, updating guesses for $I_o^*$ until convergence of Equation (29).
9. Repeat acts 2-8, updating estimates of $\Delta E_{th}^{ref}$ until total impedance over current is accurately predicted, as judged from data at a particular temperature, cell aging, and total pulse time.
10. Once $I_o^*$ and $I_{max}$ have been determined, then the generalized form of the modified Butler-Volmer expression (θ–BV) can be used at any arbitrary current density to solve for $M_\eta(i)$ via Equation (23).

As a caveat, the act listed last implies that a "mature" pulse is achieved at the same pulse time for all currents. In practice, this is only an approximation since mature fully developed voltage profiles will be seen at higher currents, especially at lower temperatures. Hence, use of Equation (23) in this context could introduce inaccuracies at low current regions.

Thus, an alternative method may be developed that overcomes such limitations, based on a pair of single-sigmoid model (SSM) expressions that incorporate salient physical parameters, chemical parameters, or a combination thereof. Sigmoidal expressions carry several advantages in looking at complex phenomena over various domains, as they are robust, contain only three parameters, are easily differentiable, and highly accurate once reasonable estimates have been given for the parameters. They can also be combined (summed) to evaluate multiple mechanistic contributions to a phenomenon. Additional details regarding sigmoidal expressions may be found in U.S. patent application Ser. No. 12/571,253, titled "SYSTEMS, METHODS AND COMPUTER READABLE MEDIA FOR ESTIMATING CAPACITY LOSS IN RECHARGEABLE ELECTROCHEMICAL CELLS," filed on Sep. 30, 2009, the disclosure of which is hereby incorporated by reference in its entirety.

One SSM expression derived for one or more embodiments of the present invention is:

$$M_\eta(I) = M_{SSM,\eta}^*(I) = 2M_{ref}^* \left( \frac{1}{2} - \frac{1}{1 + \exp(a_I |I|^{b_I})} \right) \quad (30)$$

and:

$$a_I = f_V f_{PF,\theta} f_I = \left( \frac{\left| I_{max} \left( \frac{RT}{nFI_o^*} + R_{ohmic} \right) \right|}{V_{cell} - V_{min}} \right) \left( \frac{1 + PF}{1 + \theta_{eff}} \right)^{b_I} (\bar{I})^{-b_I} \quad (31)$$

for:

$$\bar{I} = (I_o^* I_{max})^{0.5} \quad (32)$$

and:

$$b_I = \frac{1}{2}(1 + \theta_{eff}) \quad (33)$$

$$M_{ref}^* = I_{max} \left( \frac{RT}{nFI_o^*} + R_{ohmic} \right) \quad (34)$$

Thus, the SSM expression yields an approximation of the total hypothetical voltage drop at a given current for a mature pulse.

Since one eventual goal may be to describe the pulse-time dependence of the voltage drop, a time-dependent parameter $M_\eta(t)$ may be defined such that $M_\eta(t) \leq M_\eta(I)$, and $M_\eta(t) \rightarrow M_\eta(I)$ as pulse time becomes greater. Again, the robustness of sigmoidal mathematics was utilized, wherein an effective rate expression was derived to describe voltage drop over $t_{pulse}$, given the current, temperature, cell aging, and the $M_{SSM,\eta}^*(I)$ result from Equation (30):

$$M_\eta(t) = M_{SSM,\eta}^*(t) = 2M_{SSM,\eta}^*(I) \left( \frac{1}{2} - \frac{1}{1 + \exp(a_t (t_{pulse})^{b_t})} \right) \quad (35)$$

where $$a_t = \left[ \pi^2 |I| \left( \frac{V_{cell} - |M_{SSM,\eta}^*(I)| - |IR_{ohmic}|}{V_{cell}} \right) \right]^{b_t} \quad (36)$$

$$b_t = \frac{1}{2} \quad (37)$$

In the above equations it is necessary to assign an aging and temperature dependence on $\theta_{eff}$, which is accomplished as:

$$\theta_{eff}(T, \text{aging}) = \theta_{eff,o}(T) \sqrt{(1-PF)} \quad (38)$$

where $\theta_{eff,o}(T)$ represents the effective electrode surface availability for a new (un-aged) cell at temperature and PF is the fraction of "performance fade" of interest, which herein is defined in terms of loss of cell conductance over time. The square-root dependence was verified by comparing $\theta_{eff}$ for Gen2 Li-ion cells of various performance fade. This aspect of defining significant parameters in terms of aging is important for having a method that will be predictive and thus provide estimates of dependent variables (voltage drop, impedance terms, achievable power, etc.) that are crucial in assessing future battery performance in a particular application.

In practice, an iterative procedure may be used to assure correct assessment of voltage drop over pulse time by performing the acts of:

1. Determine $I_o^*$, $I_{max}$, $\Delta E_{th}^{ref}$, and $\theta_{eff}(T, \text{aging})$ as detailed above at a target temperature.
2. Initiate pulse timeline.
3. Advance one time step.
4. Provide estimate of $i_o(t)$, based on initial guess, or value from previous time step.

5. At a low current $I_{ref}$, at or below the estimated exchange current density, evaluate the overpotential at elapsed pulse time $\eta_{ct,BV}(t)$ via the θ–BV expression:

$$\frac{i_{ref}}{i_o(t)} = \exp(\chi \eta_{ct,BV}(t)) - \exp(-\chi \eta_{ct,BV}(t)) \quad (39)$$

6. At $I_{ref}$ use the SSM expressions (30) through (38) to obtain the SSM-derived voltage drop $M^*_{SSM,\eta}(t)$.
7. Compare $\eta_{ct,BV}(t)$ to $M^*_{SSM,\eta}(t)$ and update guess for $i_o(t)$ according to difference thereof.
8. Repeat acts 5-7 until convergence is reached for $i_o(t)$ within a predefined tolerance.
9. Repeat acts 3-8, covering total pulse time of interest. This establishes all $i_o(t)$.
10. Use results of act 9 and Equation (39) with any arbitrary current to obtain the non-ohmic voltage drop at the (I,t) of interest.
11. As an independent evaluation, utilize the SSM formalism in Equations (30) through (38) to determine the non-ohmic voltage drop at the (I,t) of interest.
12. Add the ohmic drop ($I^*R_{ohmic}$) to the results of acts 10 and 11 to obtain the total voltage drops for those methods.
13. Utilize Equations (15-19) to determine the constituent impedances for both the modified Butler-Volmer expression (θ–BV) and the SSM methods, resulting in these quantities in terms of temperature, I, $t_{pulse}$, and cell aging,
14. Impedance terms, Joule heating, and available power calculations can then follow using conventional expressions.

Thus, in effect the SSM trains the modified Butler-Volmer expression (θ–BV) in the time domain, enabling determination of $i_o(t)$. The collective SSM expressions (30) through (37) comprise what is denoted herein as a Generalized Electrochemical Rate Expression (GERE), giving the modified Butler-Volmer expression with a generalized rate expression model (θ–BV/GERE), a synergistic combination that enables powerful diagnostic analyses of cell performance in multiple domains.

The SSM parameters in Equations (30) and (35) have a theoretical or physical basis within the current and pulse-time domains, as applied to Li-ion cells: ($a_f, a_r$) represent rate constants, ($b_f, b_r$) are related to the effective order of reaction for the net governing process, and ($M^*_{ref}, M^*_{SSM,\eta}(I)$) are the theoretical maximum non-ohmic change in potential in the context of current. It should be noted that the forms of these SSM parameters are defined and derived to reflect the unique aspects of cell chemistry through incorporation of $I^*_o$, $I_{max}$, $\Delta E_{th}^{ref}$, $\theta_{eff}$, $R_{ohmic}$, PF, $V_{cell}$, and $V_{min}$, perhaps in this rough order of influence. Collectively, this cell chemistry incorporation ensures that the resultant modeling capability has a relevant theoretical framework supported by a consistent mathematical basis (e.g., properly bounded).

The aspect of "chemistry dependence" in Li-ion cells is extraordinarily complex, comprised of dynamic behavior of numerous simultaneous processes within a heterogeneous batch system. Thus, a true first-principles approach to the chemistry dependence of kinetic behavior might well be untenable. However, an intelligent interpretive model such as the θ–BV/GERE provides remarkable accuracy utilizing the above terms as a basis without the need for first-principles rigor.

The θ–BV/GERE model itself is not chemistry-specific, but rather general in its approach. Values of the inputs reflect a cell chemistry and its aging effects (PF), and thus, the outputs will also reflect behavior of that same chemistry. This approach may be a desired path to producing a viable robust tool that can find timely and broad utilization.

3. Demonstration of Capability

The basic modified Butler-Volmer expression (θ–BV) model was demonstrated in FIGS. 4A, 4B, 9A, 9B, 10A and 10B. The θ–BV/GERE methods toward extending this capability into the pulse-time domain were programmed and applied to Li-ion test data for Gen2 cells 14 and 80 (constant-current discharge conditions). For brevity, results for cell 80 are given below. Total impedance values for both data and model results were obtained by $R_{total}=\Delta V(t)/I$, that is, Ohm's Law analysis.

What follows in FIGS. 13-18B gives a clear indication of the robust nature of the resultant model, which provides accurate renderings of significant performance measures over a wide range of conditions. Such a capability would be effective for upfront performance screening of new cells and cell materials, diagnostic testing toward determining mechanistic limitations, and for on-board analysis of cell performance for a number of consumer electronics applications, power grid applications, and vehicle applications of Li-ion cells.

Figure 13:
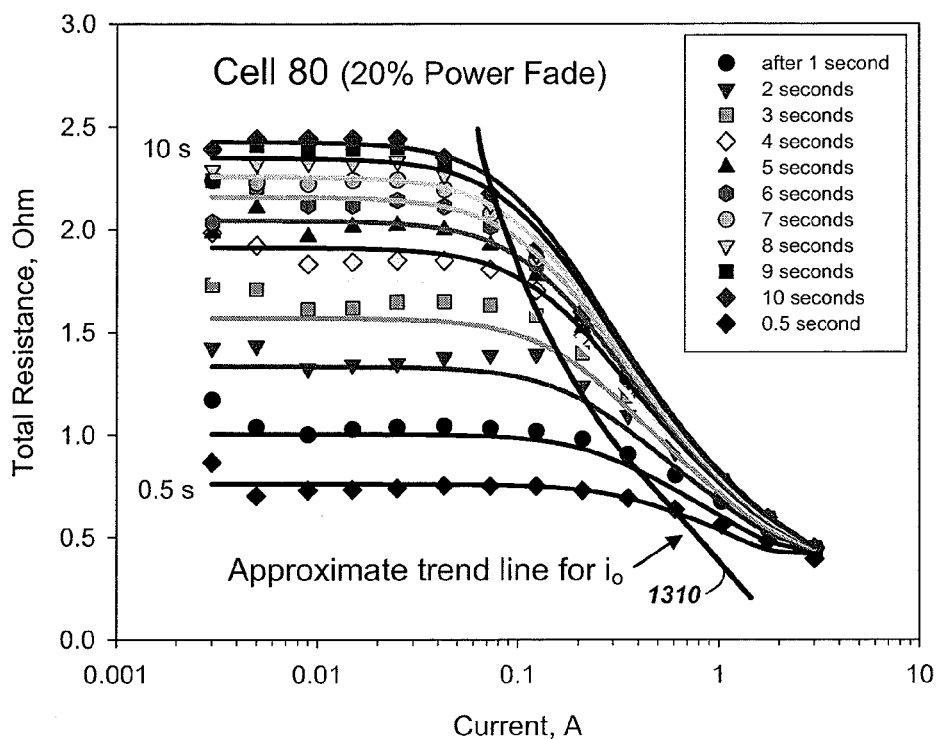
FIG. 13 illustrates total impedance relative to current for an electrochemical cell at −30° C., considering various elapsed times of constant-current discharge pulses.

FIG. 13 illustrates total impedance relative to current for an electrochemical cell at various elapsed times of constant-current discharge pulses. Total impedance for Gen2 cell 80 under constant-current discharge pulsing at −30° C., shows growth of impedance over pulse timeline. The predicted model results (solid curves) agree well with the experimental data (symbols). Also illustrated is an approximate trend line 1310 for $I_o$.

Figure 14:
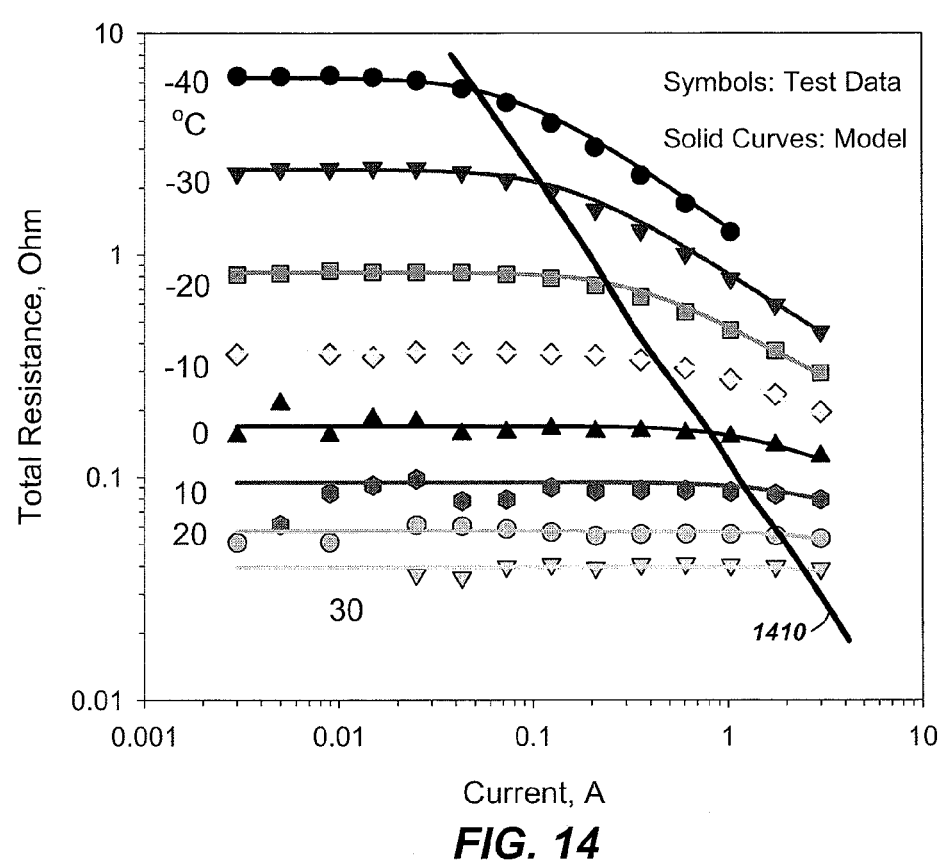
FIG. 14 illustrates total impedance relative to current for an electrochemical cell at various temperatures during constant-current discharge pulses, where the elapsed pulse time per pulse is 10 seconds.

FIG. 14 illustrates total impedance relative to current for an electrochemical cell at various temperatures during a constant-current discharge pulse. These curves illustrate total impedance for Gen2 cell 80 after ten seconds of constant-current discharge pulsing at several temperatures. Agreement is exceptional. Also illustrated is an approximate trend line 1410 for $I_o$.

Figure 15:
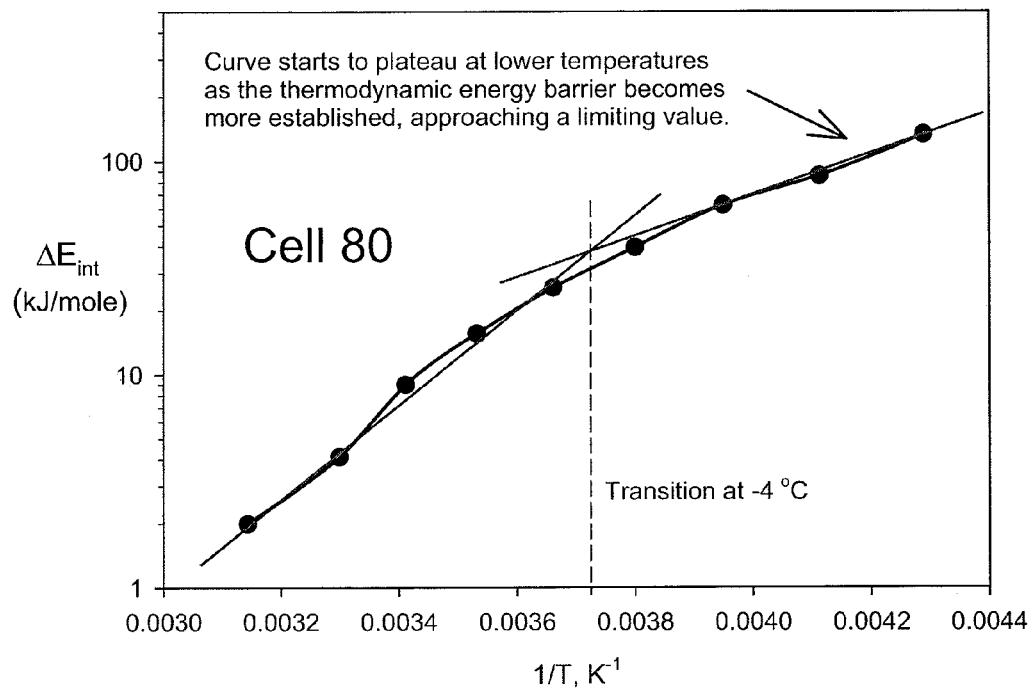
FIG. 15 is a graph of interfacial thermodynamic energy barrier of an electrochemical cell showing a strong temperature dependence.

FIG. 15 is a graph of interfacial thermodynamic energy barrier (also referred to as $\Delta E_{th}^{ref}$) for cell 80, showing a strong temperature dependence. Values were ascertained from changes in voltage potential within Impedance vs. log(I) plots over temperature in concert with θ-BV calculations, and through application of Equations (24) through (29). These results infer one or more thermodynamic processes occur over temperature to increase the interfacial impedance. Mechanisms for this could include increased solvent ordering, rearrangement, adsorption, or phase formation at electrode interfaces and inside porous regions, which are more prone to occur at OCV conditions.

Figure 16:
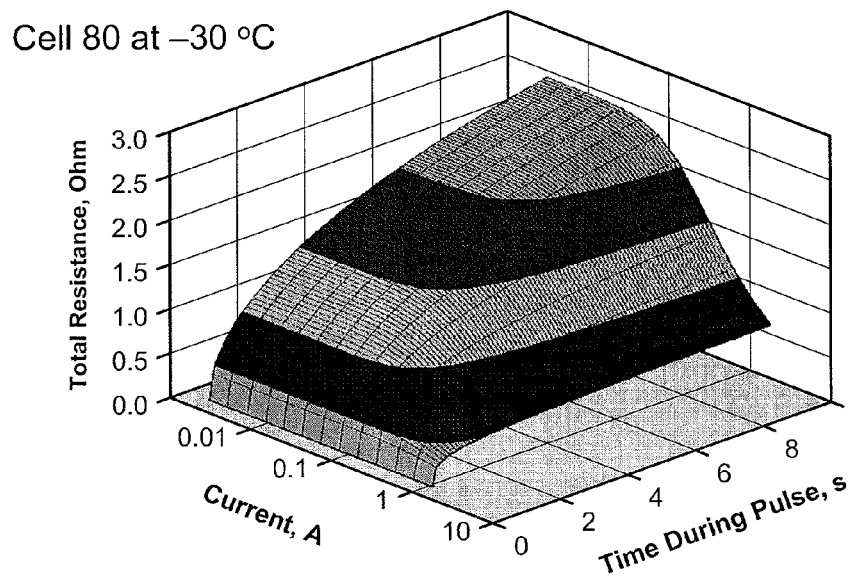
FIG. 16 illustrates a predicted 3D profile of total impedance of an electrochemical cell at −30° C. over a matrix of current and pulse time, using an embodiment of the present invention with a constant-current discharge pulse basis.

FIG. 16 illustrates a predicted 3D profile of total impedance of cell 80 at −30° C. over a matrix of current and pulse time, using θ–BV/GERE under a constant-current discharge pulse basis.

Figure 17A:
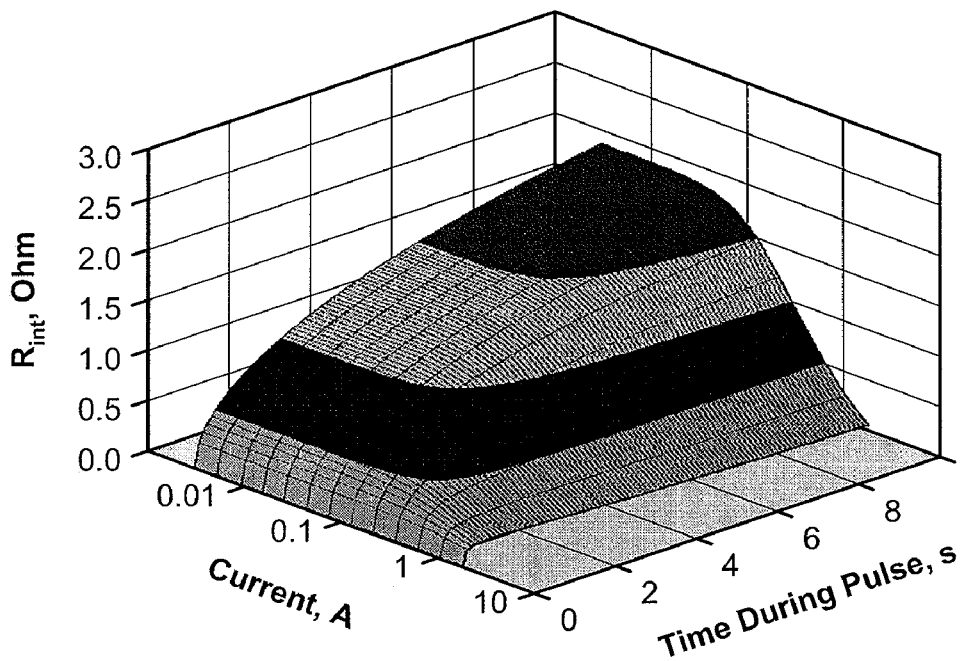
FIGS. 17A and 17B illustrate predicted 3D profiles of charge transfer resistance from mass transfer limitations and charge transfer resistance from kinetic contributions, respectively, of an electrochemical at −30° C. over a matrix of current and pulse time, using an embodiment of the present invention with a constant-current discharge pulse basis.

FIG. 17A illustrates a predicted 3D profile of charge transfer resistance from mass transfer limitations of electrochemical cell 80 at −30° C. over a matrix of current and pulse time, using an embodiment of the present invention with a constant-current discharge pulse basis.

Figure 17B:
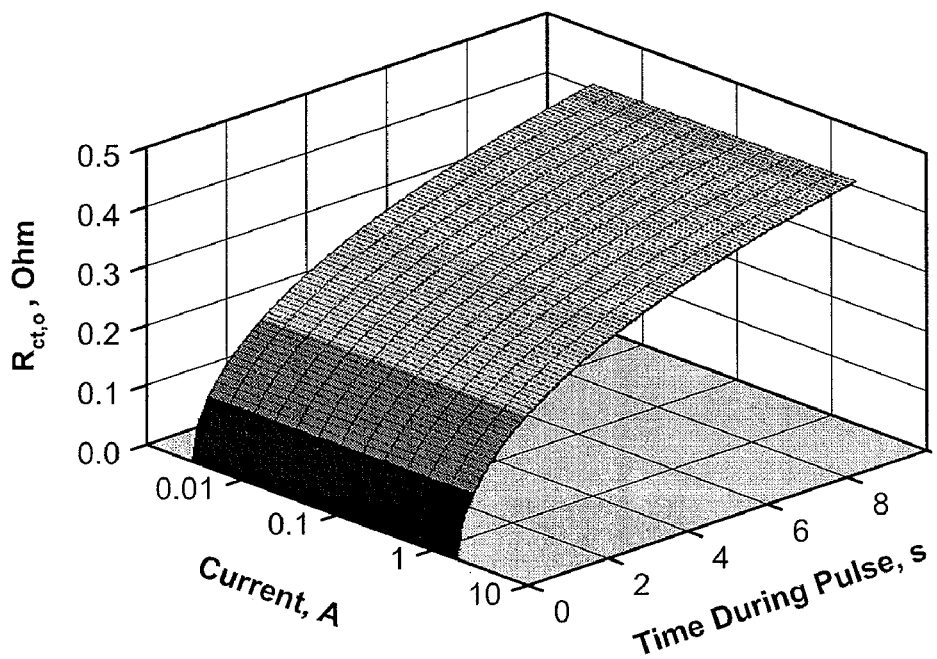

FIG. 17B illustrates a predicted 3D profile of charge transfer resistance from kinetic contributions of electrochemical cell 80 at −30° C. over a matrix of current and pulse time, using an embodiment of the present invention with a constant-current discharge pulse basis.

Figure 18A:
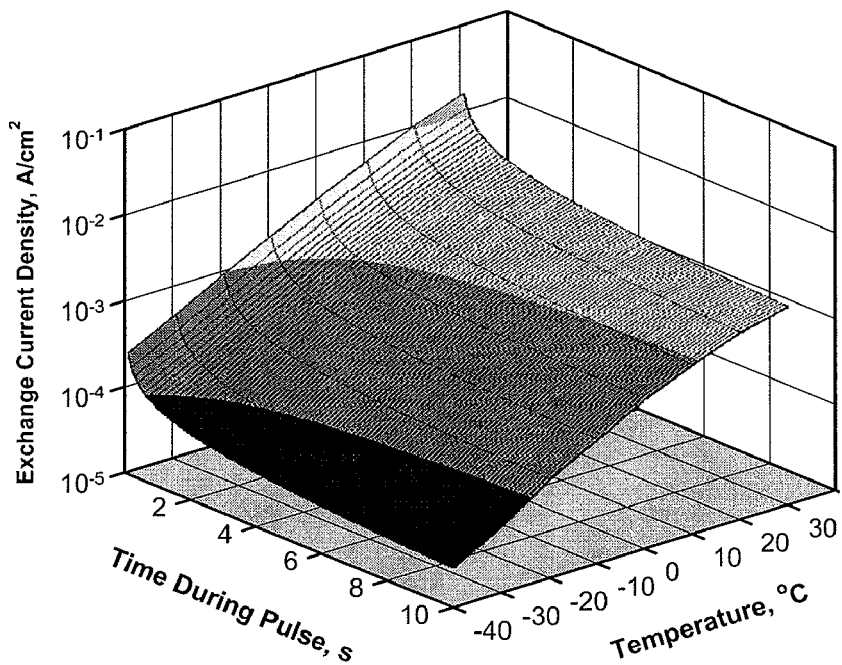
FIGS. 18A and 18B illustrate predicted 3D profiles of exchange current density and achievable power, respectively, for an electrochemical at −30° C. over a matrix of current and pulse time, using an embodiment of the present invention with a constant-current discharge pulse basis.

FIG. 18A illustrates a predicted 3D profile of exchange current density for electrochemical cell 80 at −30° C. over a matrix of current and pulse time, using an embodiment of the present invention with a constant-current discharge pulse basis.

Figure 18B:
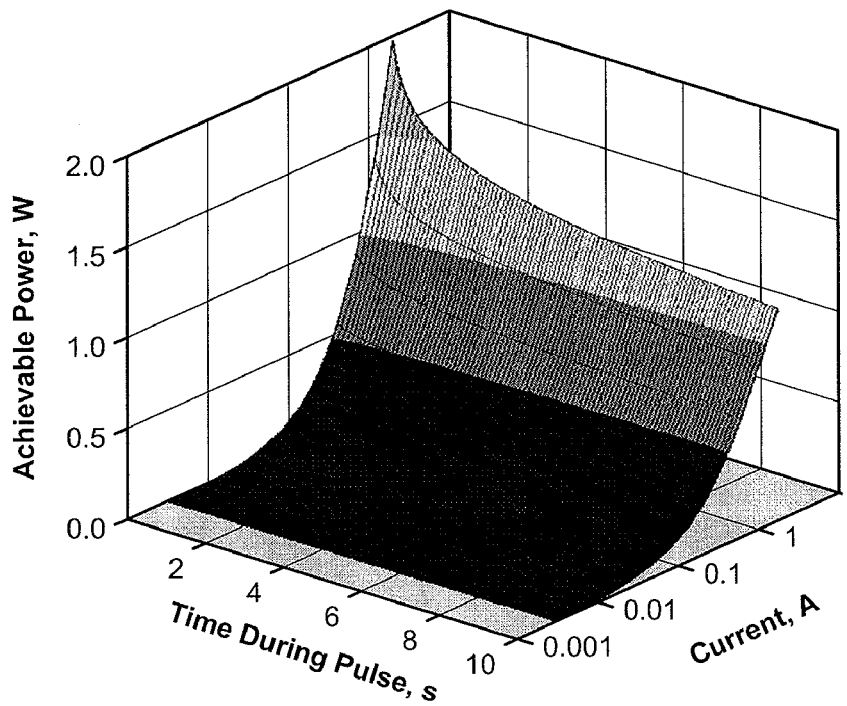

FIG. 18B illustrates a predicted 3D profile of achievable power for electrochemical cell 80 at −30° C. over a matrix of current and pulse time, using an embodiment of the present invention with a constant-current discharge pulse basis.

4. Power Calculations

For some applications, it may be more appropriate to analyze electrochemical cells in the context of power rather than current. It has been demonstrated that one of the primary quantities predicted by the θ−BV model is the voltage drop over pulse time, given various aspects of cell conditions (temperature, current, State-of-Charge (SOC) or beginning voltage, cell age, etc.). This capability directly lends itself to calculation of available power. By maintaining constant current conditions then power as a function of pulse time may be defined as:

$$P_{avail.}(t) = I[V_{start} - \Delta V(t) - V_{min}]$$

then $$P_{avail.}(t) = I[V(t) - V_{min}]$$

where $V_{min}$ is the lowest voltage at which energy is available given the cell chemistry and design. Clearly, power will decrease over a constant-current pulse. If a constant power basis is chosen, then current must be varied (increased) over pulse time to satisfy this condition:

$$P_{avail.} = I(t)[V_{start} - \Delta V(t) - V_{min}]$$

then $$P_{avail.} = I(t)[V(t) - V_{min}]$$

Achieving constant power pulses involves an iterative scheme whereby the current is adjusted until the product of current and net available voltage is equal to the target power within a given tolerance. With this in mind, the θ−BV model can be incorporated into an iterative scheme for determining voltage drops and current requirements for constant-power pulses. For a given point in pulse time this may be done by applying the θ−BV model as-is on currents progressing under iteration, until the above equation is satisfied for the target power. This procedure is then repeated over the entire range of pulse time. Such a capability is of significant value to most applications involving relatively high power requirements at well-defined levels such as vehicle applications and power tool applications.

Thus, the θ−BV model can be easily adapted to scenarios of constant power cell operation. This adaptation permits forecasting of achievable power performance over temperature and cell aging at a SOC of interest. Therefore, if the θ−BV model is coupled with a multiple sigmoid model to establish cell aging over time (for example, performance fade with respect to cell conductance), then it could be determined at what point in aging time a cell would no longer be able to deliver the requested power. This capability has direct application to warranty issues and predicting when batteries should either be removed from primary service and placed in a secondary role (e.g., vehicle-to-grid), or constrained to operate only under lower-power conditions. This capability can also enhance battery management and safety since cells no longer able to meet power goals will not be pushed into conditions that could result in failure in terms of total loss of performance or thermal runaway.

5. Summary

The modeling basis described herein includes a θ−BV methodology that allows accurate interpretations of kinetic performance of electrochemical systems, providing advantages over the traditional BV in determining realistic limitations tied to electrode surface availability. This modification to the traditional BV is of significant importance for porous electrode materials found in most Li-ion cells/batteries and capacitor devices.

The disclosed methodology allows diagnostic analysis to be performed, accurately providing key quantities central to understanding kinetic limitations in electrochemical devices, such as the (1) exchange current density ($i_o$) over pulse time, temperature, and cell aging, (2) the effective electrode surface availability ($\theta_{eff}$) over temperature and cell aging, (3) the thermodynamic interfacial energy barrier ($\Delta E_{th}^{ref}$) over temperature and cell aging, (4) as well as various overpotential and impedance terms dealing with the intrinsic charge transfer ($R_{ct,o}$), mass-transport limitations ($R_{mt}$), ohmic contributions ($R_{ohmic}$), and total impedance ($R_{total}$).

In iterative algebraic analysis of the θ−BV model together with a plot of impedance versus log current, showing the near-linear region between $i_o$ and $I_{max}$ allows direct determination of these reference quantities. Such a plot is unique for a given temperature, pulse duration, pulse type, cell chemistry, and cell aging.

The disclosed methodology is robust and accurate over temperature and electrical current and applies equally to both charge and discharge conditions. The disclosed methodology also accounts for the relative extent of performance loss over time in the electrochemical device (aging effects). The disclosed methodology is demonstrated for constant-current pulses, but can be adapted to constant-power pulses or other time-variable pulse types.

The θ−BV methodology, coupled with a set of two single-sigmoid models (SSM), collectively denoted θ−BV/GERE, enables accurate calculation of kinetic performance over pulse time, providing parameter values over the pulse time-line. The SSM is used to train the θ−BV calculations to derive exchange current density ($i_o$) over pulse duration. Once exchange current density ($i_o$) is thusly determined, other related quantities can be easily calculated as functions of time. A first SSM determines what maximum voltage drop would be encountered at a particular current as a fraction of the overall maximum voltage drop assessed at $I_{max}$. A second SSM determines what voltage drop would be encountered over progressive pulse time, given a current, as a fraction of the maximum voltage drop assessed at that current from the first SSM. Parameters for the SSMs are defined and derived to reflect the unique aspects of cell chemistry through incorporating $I^*_o$, $I_{max}$, $\Delta E_{th}^{ref}$, $\theta_{eff}$, $R_{ohmic}$, PF, $V_{cell}$, and $V_{min}$.

Applications for this capability abound in battery research and product development, and onboard monitoring of consumer electronics, battery power grid applications, and vehicle applications (e.g., electric vehicles (EV), hybrid electric vehicles (HEV), and plug-in hybrid electric vehicles (PHEV)). Collectively, these represent a multi-billion dollar industry.

Although this invention has been described with reference to particular embodiments, the invention is not limited to these described embodiments. Rather, the invention is encompassed by the appended claims and their legal equivalents.

What is claimed is:

1. A method, comprising:
analyzing an electrochemical cell with a modified Butler-Volmer (BV) expression to determine an exchange current density, wherein the modified BV expression includes a BV expression modified to include kinetic performance information for at least one of a pulse-time dependence and an electrode surface availability;
including a rate expression comprising a sigmoid model in the modified BV expression to determine the kinetic performance as a function of pulse time; and
estimating a kinetic performance of the electrochemical cell at a desired point in pulse time using the modified BV expression;
wherein at least one act of the method is performed by a processor.

2. The method of claim 1, further comprising using the modified BV expression to predict at least one of the exchange current density, the electrode surface availability, and a thermodynamic interfacial energy barrier for future cell aging.

3. The method of claim 1, further comprising using the modified BV expression to determine the exchange current density over a span of at least one of temperature, pulse time, and electrical current.

4. The method of claim 1, further comprising using the modified BV expression to determine the electrode surface availability over a span of at least one of temperature and electrical current.

5. The method of claim 1, further comprising using the modified BV expression to determine a thermodynamic interfacial energy barrier over a span of at least one of temperature and electrical current.

6. The method of claim 1, further comprising determining an overpotential and an electrical current for the electrochemical cell by including in the modified BV expression at least one of intrinsic charge transfer, mass-transport limitations, ohmic contributions, and total impedance.

7. The method of claim 1, further comprising including the sigmoid model to determine a maximum voltage drop encountered at a particular electrical current.

8. The method of claim 7, further comprising including the sigmoid model to determine a voltage drop encountered over a progressive pulse time at a predetermined electrical current, wherein the voltage drop is a fraction of the maximum voltage drop at the particular electrical current.

9. The method of claim 1, further comprising using the modified BV expression to determine the exchange current density with constant-current pulses.

10. The method of claim 1, further comprising using the modified BV expression to determine the exchange current density with constant-power pulses.

11. A model development method, comprising:
periodically sampling cell characteristics of an electrochemical cell;
analyzing the cell characteristics of the electrochemical cell with a modified Butler-Volmer (BV) expression to determine exchange current density, wherein a BV expression is modified to include kinetic performance information for at least one of a pulse-time dependence and an electrode surface availability;
including a rate expression comprising a sigmoid model in the modified BV expression to determine the kinetic performance as a function of pulse time; and
estimating a kinetic performance of the electrochemical cell at a desired point in pulse time using the cell characteristics in the modified BV expression;
wherein at least one act of the method is performed by a processor.

12. The method of claim 11, further comprising including the sigmoid model to determine a maximum voltage drop encountered at a particular electrical current.

13. The method of claim 12, further comprising including the sigmoid model to determine a voltage drop encountered over a progressive pulse time at a predetermined electrical current, wherein the voltage drop is a fraction of the maximum voltage drop at the particular electrical current.

14. The method of claim 11, further comprising selecting the cell characteristics to include one or more of a cycling rate, a pulse duration, a voltage, a current, and a temperature.

15. A method, comprising:
analyzing a kinetic performance characteristic of an electrochemical cell with a modified Butler-Volmer (BV) expression to determine an exchange current density, wherein the modified BV expression includes a BV expression modified to include kinetic performance information for at least one of a pulse-time dependence and an electrode surface availability;
including a rate expression comprising a sigmoid model in the modified BV expression to determine the kinetic performance as a function of pulse time;
estimating a kinetic performance of the electrochemical cell at a desired point in pulse time using the modified BV expression; and
modifying at least one of a discharge process for, a charge process for, and composition of, the electrochemical cell responsive to the estimating the kinetic performance;
wherein at least one act of the method is performed by a processor.

16. The method of claim 15, further comprising including the sigmoid model to determine a maximum voltage drop encountered at a particular electrical current.

17. The method of claim 16, further comprising including the sigmoid model to determine a voltage drop encountered over a progressive pulse time at a predetermined electrical current, wherein the voltage drop is a fraction of the maximum voltage drop at the particular electrical current.

18. The method claim 15, wherein modifying the composition of the electrochemical cell comprises at least one of modifying a composition of an anode, modifying a composition of a cathode, modifying a composition of an electrolyte, and modifying a relative arrangement of the anode, the cathode, and the electrolyte.

19. A system, comprising:
an electrochemical cell; monitoring hardware operably coupled to the electrochemical cell and configured for periodically sampling cell characteristics of the electrochemical cell; and
a computing system operably coupled to the monitoring hardware and configured for periodically:
determining electrochemical cell information from the cell characteristics of the electrochemical cell;
analyzing a kinetic performance characteristic of the electrochemical cell with a modified Butler-Volmer (BV) expression incorporating the electrochemical cell information to determine an exchange current density, wherein the modified BV expression includes a BV expression modified to include kinetic performance information for at least one of a pulse-time dependence and an electrode surface availability; and
including a rate expression comprising a sigmoid model in the modified BV expression to determine the kinetic performance as a function of pulse time.

20. The system of claim 19, wherein the computing system comprises a memory for storing computing instructions and a processor operably coupled to the memory and configured for executing the computing instructions to carry out the acts of determining the electrochemical cell information, analyzing the kinetic performance characteristic, and estimating the kinetic performance of the electrochemical cell.

21. The system of claim 19, wherein the computing system is further configured for estimating a kinetic performance of the electrochemical cell at a desired point in pulse time using the cell characteristics in the modified BV expression.

22. The system of claim 19, wherein the sigmoid model comprises a model to determine a maximum voltage drop encountered at a particular electrical current.

23. The system of claim 22, wherein the sigmoid model comprises a model to determine a voltage drop encountered over a progressive pulse time at a predetermined electrical current, wherein the voltage drop is a fraction of the maximum voltage drop at the particular electrical current.

24. The system of claim 19, wherein the cell characteristics include one or more of a cycling rate, a pulse duration, a voltage, a current, and a temperature.

25. A non-transitory computer-readable medium including computer-executable instructions, which when executed on one or more processors, perform the acts comprising:
analyzing an electrochemical cell with a modified Butler-Volmer (BV) expression to determine an exchange current density, wherein the modified BV expression includes a BV expression modified to include kinetic performance information for at least one of a pulse-time dependence and an electrode surface availability;
including a rate expression comprising a sigmoid model in the modified BV expression to determine the kinetic performance as a function of pulse time; and
estimating a kinetic performance of the electrochemical cell at a desired point in pulse time using the modified BV expression.

26. The computer-readable medium of claim 25, wherein the sigmoid model comprises computer-executable instructions to determine a maximum voltage drop encountered at a particular electrical current.

27. The computer-readable medium of claim 26, wherein the sigmoid model comprises computer-executable instructions to determine a voltage drop encountered over a progressive pulse time at a predetermined electrical current, wherein the voltage drop is a fraction of the maximum voltage drop at the particular electrical current.

28. The computer-readable medium of claim 25, wherein the computer-executable instructions further comprises instructions for:
periodically sampling cell characteristics of the electrochemical cell; and
including the cell characteristics in the modified BV expression for determining testing parameters of the electrochemical cell including one or more of a cycling rate, a pulse duration, a voltage, a current, and a temperature.

* * * * *